(12) United States Patent
Yamazaki et al.

(10) Patent No.: US 9,203,592 B2
(45) Date of Patent: Dec. 1, 2015

(54) MOBILE COMMUNICATION SYSTEM, BASE STATION, AND USER TERMINAL

(75) Inventors: Chiharu Yamazaki, Ota-ku (JP); Kugo Morita, Yokohami (JP)

(73) Assignee: KYOCERA Corporation, Kyoto (JP)

( * ) Notice: Subject to any disclaimer, the term of this patent is extended or adjusted under 35 U.S.C. 154(b) by 45 days.

(21) Appl. No.: 14/348,287

(22) PCT Filed: Sep. 29, 2011

(86) PCT No.: PCT/JP2011/072474
§ 371 (c)(1),
(2), (4) Date: Mar. 28, 2014

(87) PCT Pub. No.: WO2013/046410
PCT Pub. Date: Apr. 4, 2013

(65) Prior Publication Data
US 2014/0301254 A1     Oct. 9, 2014

(51) Int. Cl.
| | | |
|---|---|---|
| H04W 4/00 | (2009.01) |
| H04L 5/00 | (2006.01) |
| H04L 5/14 | (2006.01) |
| H04W 36/20 | (2009.01) |
| H04W 36/06 | (2009.01) |
| H04W 84/10 | (2009.01) |
| H04W 84/04 | (2009.01) |
| H04W 36/00 | (2009.01) |
| H04W 36/28 | (2009.01) |

(52) U.S. Cl.
CPC ............... *H04L 5/0073* (2013.01); *H04L 5/14* (2013.01); *H04W 36/20* (2013.01); *H04L 5/001* (2013.01); *H04W 36/0072* (2013.01); *H04W 36/06* (2013.01); *H04W 36/28* (2013.01); *H04W 84/045* (2013.01); *H04W 84/10* (2013.01)

(58) Field of Classification Search
CPC ......... H04L 5/0073; H04L 5/14; H04L 5/001; H04W 36/06; H04W 84/10; H04W 84/045; H04W 36/0072; H04W 36/20; H04W 36/28
See application file for complete search history.

(56) References Cited

U.S. PATENT DOCUMENTS

| | | | | |
|---|---|---|---|---|
| 8,867,494 | B2 * | 10/2014 | Blanz et al. ................... 370/332 |
| 2009/0270103 | A1 | 10/2009 | Pani et al. | |
| 2010/0234037 | A1 | 9/2010 | Terry et al. | |

(Continued)

FOREIGN PATENT DOCUMENTS

| | | |
|---|---|---|
| JP | 2011-521524 A | 7/2011 |
| WO | 2009/123105 A1 | 10/2009 |
| WO | 2010/106735 A1 | 9/2010 |

OTHER PUBLICATIONS

International Search Report; PCT/JP2011/072474; Nov. 15, 2011.
3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-194.

(Continued)

*Primary Examiner* — Clemence Han
(74) *Attorney, Agent, or Firm* — Studebaker & Brackett PC

(57) ABSTRACT

A mobile communication system that employs a frequency division duplex scheme, comprises: one or a plurality of UEs (200) that communicate with a serving cell; and a HeNB (100) that constitutes a first cell and a second cell, wherein the first cell uses a pair of first uplink carrier and downlink carrier for communication, the second cell uses a pair of a second uplink carrier and the downlink carrier for communication, and the HeNB (100) and the UE (200) switch a serving cell of the UE (200) between the first cell and the second cell by a handover procedure.

16 Claims, 15 Drawing Sheets

(56) References Cited

U.S. PATENT DOCUMENTS

| | | |
|---|---|---|
| 2011/0034177 A1 | 2/2011 | Oh et al. |
| 2012/0004010 A1 | 1/2012 | Tamura et al. |
| 2012/0063302 A1* | 3/2012 | Damnjanovic et al. ....... 370/228 |
| 2012/0307715 A1* | 12/2012 | Maeda et al. ................. 370/315 |
| 2014/0219202 A1* | 8/2014 | Kim et al. .................... 370/329 |

OTHER PUBLICATIONS

An Office Action; "Notice of Reasons for Rejection," issued by the Japanese Patent Office on Sep. 29, 2015, which corresponds to Japanese Patent Application No. 2014-231146 and is related to U.S. Appl. No. 14/348,287; with English language statement of relevance.

* cited by examiner

FIG. 1
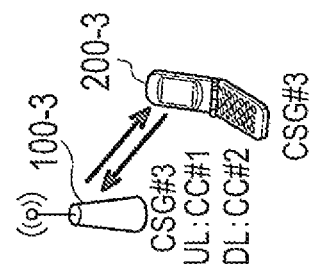
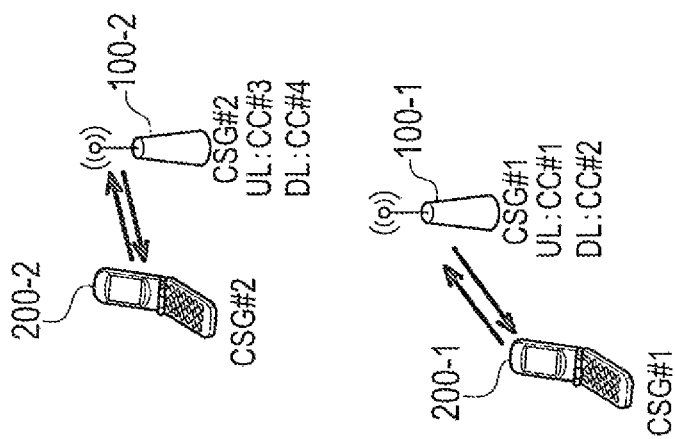

MOBILE COMMUNICATION SYSTEM, BASE STATION, AND USER TERMINAL

TECHNICAL FIELD

The present invention relates to a mobile communication system employing a FDD scheme, a base station, and a user terminal.

BACKGROUND ART

In 3GPP (3rd Generation Partnership Project) which is a project aiming to standardize a mobile communication system, the standardization of an LTE Advanced, which is a sophisticated version of LTE (Long Term Evolution), is conducted after 3GPP Release 10.

The LTE and the LTE Advanced may employ frequency division duplex (FDD) or time division duplex (TDD). In the FDD scheme, carriers (frequency bands) differ in an uplink and a downlink, and communication is performed using a pair of an uplink carrier and a downlink carrier.

Furthermore, the LTE and the LTE Advanced introduce a home base station that is a small base station provided to a home or a company (see Non-Patent Literature 1). To impose an access restriction, the home base station may constitute a CSG (Closed Subscriber Group) cell accessible by a specific user only.

Moreover, the LTE Advanced introduces carrier aggregation, in which carriers in the LTE are positioned as component carriers and a combination of a plurality of carriers is used for communication, in order to achieve a wider band while ensuring backward compatibility with the LTE (see Non-Patent Literature 1).

PRIOR ART DOCUMENT

Non-Patent Document

Non-Patent Document 1: 3GPP Technical Specification TS 36.300 V10.4.0

SUMMARY OF THE INVENTION

However, the home base station may be arbitrarily installed by a user differently from a macro base station installed by cell site design of an operator, resulting in a cause of inter-base station interference.

In this regard, after the 3GPP Release 11, there is a desire to provide a scheme of avoiding inter-base station interference by applying the aforementioned carrier aggregation.

Therefore, the present invention provides a mobile communication system capable of avoiding inter-base station interference, a base station, and a user terminal.

According to an aspect of the present invention, the mobile communication system that employs a frequency division duplex scheme, comprising: one or a plurality of user terminals that communicate with a serving cell; and a base station that constitutes a first cell and a second cell, wherein the first cell uses a pair of first uplink carrier and downlink carrier for communication, the second cell uses a pair of a second uplink carrier and the downlink carrier for communication, and the base station and the user terminal switch a serving cell of the user terminal between the first cell and the second cell by a handover procedure, is provided.

According to another aspect of the present invention, the first cell uses a first radio frame for downlink communication, the second cell uses a second radio frame for downlink communication, and the base station sets to differ a frame configuration of the first radio frame from a frame configuration of the second radio frame such that the downlink carrier is shared in the first cell and the second cell in time division.

According to the other aspect of the present invention, the first radio frame includes a first MBSFN subframe and a first non-MBSFN subframe, the second radio frame includes a second MBSFN subframe and a second non-MBSFN subframe, and the base station sets the frame configurations of the first radio frame and the second radio frame such that the first non-MBSFN subframe and the second MBSFN subframe overlap on a time axis, and the second non-MBSFN subframe and the first MBSFN subframe overlap on the time axis.

According to the other aspect of the present invention, on the basis of a traffic situation in each of the first cell and the second cell, the base station sets the frame configurations of the first radio frame and the second radio frame again such that a ratio of the time division is adjusted.

According to the other aspect of the present invention, the first radio frame includes a first specific subframe that should transmit a downlink broadcast signal, the second radio frame includes a second specific subframe that should transmit a downlink broadcast signal, and the base station sets the frame configurations of the first radio frame and the second radio frame such that the first specific subframe and the second specific subframe do not overlap on the time axis.

According to the other aspect of the present invention, the first radio frame includes a plurality of first subframes to which subframe numbers are assigned, the second radio frame includes a plurality of second subframes to which subframe numbers are assigned, the first specific subframe is a subframe having a specific subframe number, of the plurality of first subframes, the second specific subframe is a subframe having the specific subframe number, of the plurality of second subframes, and the base station sets subframe numbers of the plurality of first subframes and subframe numbers of the plurality of second subframes to be shifted by a predetermined subframe number such that the first specific subframe and the second specific subframe do not overlap on the time axis.

According to the other aspect of the present invention, the user terminal omits a measurement report process, which is a process for the handover procedure and for reporting a measurement result of a reception state in the user terminal to the serving cell, when the serving cell is switched between the first cell and the second cell.

According to the other aspect of the present invention, when a serving cell of the user terminal is the first cell and an interference power level in the first uplink carrier is higher than a predetermined level, the base station controls the serving cell of the user terminal to be switched from the first cell to the second cell.

According to the other aspect of the present invention, after the serving cell of the user terminal is switched from the first cell to the second cell, the base station controls the first cell to be deactivated.

According to the other aspect of the present invention, when there is a handover request or a connection request for a new user terminal in the middle of switching the serving cell of the user terminal from the first cell to the second cell, the base station controls the new user terminal to be accommodated in the second cell.

According to the other aspect of the present invention, when the interference power level in the first uplink carrier is lower than a predetermined level after the serving cell of the user terminal is switched from the first cell to the second cell, the base station activates the first cell and controls the serving cell of the user terminal to be switched from the second cell to the first cell.

According to the other aspect of the present invention, the base station switches the serving cell of the user terminal from the second cell to the first cell and controls to deactivate the second cell.

According to the other aspect of the present invention, when there is a handover request or a connection request for a new user terminal in the middle of switching the serving cell of the user terminal from the second cell to the first cell, the base station controls the new user terminal to be accommodated in the first cell.

According to the other aspect of the present invention, on the basis of a communication state of the user terminal, the base station controls a serving cell of a user terminal with high priority among the user terminals to be preferentially switched.

According to an aspect of the present invention, a base station that constitutes a first cell and a second cell in a mobile communication system that employs a frequency division duplex scheme, comprising: a control unit that controls a serving cell of a user terminal to be switched between the first cell and the second cell by a handover procedure, wherein the first cell uses a pair of first uplink carrier and downlink carrier for communication, and the second cell uses a pair of a second uplink carrier and the downlink carrier for communication, is provided.

According to an aspect of the present invention, a user terminal that communicates with a serving cell in the mobile communication system that employs a frequency division duplex scheme, comprising: a control unit that controls the serving cell to be switched between a first cell and a second cell by a handover procedure, wherein the first cell uses a pair of first uplink carrier and downlink carrier for communication, and the second cell uses a pair of a second uplink carrier and the downlink carrier for communication, is provided.

BRIEF DESCRIPTION OF THE DRAWINGS

FIG. 1 is a diagram showing an entire configuration of a mobile communication system according to a first embodiment.

DESCRIPTION OF THE EMBODIMENT

Figure 2:
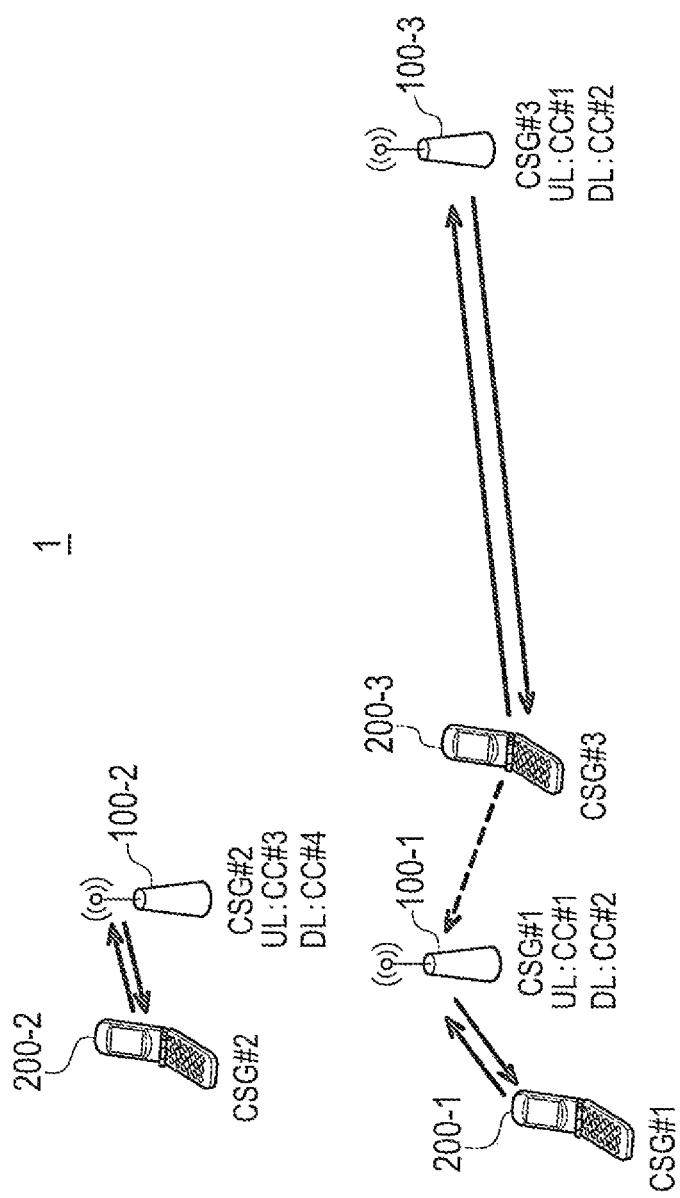
FIG. 2 is a diagram for explaining the case in which interference occurs in UL.

A first embodiment, a second embodiment, and other embodiments of the present invention are explained below with reference to drawings. In the drawings of each of the embodiments shown below, the same or similar symbols have been used in the same or similar portions.

First Embodiment

FIG. 1 is a diagram showing an entire configuration of a mobile communication system 1 according to the present embodiment. The mobile communication system 1 employs a FDD scheme.

As illustrated in FIG. 1, the mobile communication system 1 includes a plurality of home base stations (Home evolved Node Bs: HeNBs) 100 and a plurality of user terminals (User Equipments: UEs) 200.

The HeNB 100 is configured in compliance with 3GPP Release 10 and beyond, but does not support carrier aggregation. That is, the standard does not support that the HeNB 100 simultaneously uses two component carriers (CCs) for downlink (DL) communication. In addition, each CC includes a plurality of resource blocks (RBs) that are resource assignment units.

In the present embodiment, as with an office environment and the like, an environment, in which a plurality of HeNBs 100 with different CSGs are installed, is assumed. HeNB 100-1 constitutes a CSG cell of CSG#1, HeNB 100-2 constitutes a CSG cell of CSG#2, and HeNB 100-3 constitutes a CSG cell of CSG#3.

Each of the HeNB 100 monitors a radio signal that is transmitted/received around each of the HeNB 100 when power is supplied, thereby determining CC that is used around each of the HeNB 100. Then, each of the HeNB 100 decides CC, which is different from the CC used around each of the HeNB 100, as CC to be used in each of the HeNB.

The HeNB 100-1 and the HeNB 100-2 are installed adjacent to each other. Thus, for communication, the HeNB 100-1 and the HeNB 100-2 use CCs different for each uplink (UL) and each downlink (DL). Specifically, the HeNB 100-1 uses CC#1 in the UL and CC#2 in the DL. On the other hand, the HeNB 100-2 uses CC#3 in the UL and CC#4 in the DL.

UE 200-1 belongs to the CSG#1 and is connected to the HeNB 100-1. That is, the UE 200-1 employs the CSG cell constituted by the HeNB 100-1 as a serving cell. The UE 200-1 communicates with the HeNB 100-1 by using the CC#1 in the UL and the CC#2 in the DL. FIG. 1 illustrates only one UE 200-1 connected to the HeNB 100-1; however, a plurality of UEs 200-1 may be provided.

Furthermore, UE 200-2 belongs to the CSG#2 and is connected to the HeNB 100-2. That is, the UE 200-2 employs the CSG cell constituted by the HeNB 100-2 as a serving cell. The UE 200-2 communicates with the HeNB 100-2 by using the CC#3 in the UL and the CC#4 in the DL. FIG. 1 illustrates only one UE 200-2 connected to the HeNB 100-2; however, a plurality of UEs 200-2 may be provided.

The HeNB 100-3 is installed remote from the HeNB 100-1 and the HeNB 100-2. Thus, the HeNB 100-3 determines that no CC is used around the HeNB 100-3 through the aforementioned monitoring, and arbitrarily decides CC to be used in the HeNB 100-3. As a consequence, similarly to the HeNB 100-1, the HeNB 100-3 uses the CC#1 in the UL and the CC#2 in the DL.

UE 200-3 belongs to the CSG#3 and is connected to the HeNB 100-3. That is, the UE 200-3 employs the CSG cell constituted by the HeNB 100-3 as a serving cell. The UE 200-3 communicates with the HeNB 100-3 by using the CC#1 in the UL and the CC#2 in the DL. FIG. 1 illustrates only one UE 200-3 connected to the HeNB 100-3; however, a plurality of UEs 200-3 may be provided.

When the HeNB 100 and the UE 200 are in the positional relation as illustrated in FIG. 1, no interference occurs in anyone of the UL and the DL. However, in an environment in which a plurality of HeNBs 100 with different CSGs are installed, there is a case in which the UE 200 is not allowed to connect to the neighboring HeNB 100 belonging to a different CSG and is forced to connect to the remote HeNB 100 belonging to the same CSG. In this case, interference occurs in the UL.

FIG. 2 is diagram for explaining the case in which interference occurs in the UL.

As illustrated in FIG. 2, the UE 200-3 belonging to the CSG#3 is located in the vicinity of the HeNB 100-1 and is located remote from the HeNB 100-3. A radio state of the UE 200-3 is not good, but is connected to the remote HeNB 100-3 belonging to the same CSG.

A UL signal from the UE 200-3 to the HeNB 100-3 is received in the HeNB 100-1 as well as the HeNB 100-3. Furthermore, the HeNB 100-3 and the UE 200-3 use the CC#1 in the UL similarly to the HeNB 100-1 and the UE 200-1. Thus, the UL signal from the UE 200-3 to the HeNB 100-3 gives strong interference to the HeNB 100-1. As a consequence, the HeNB 100-1 is not able to normally receive a UL signal from the UE 200-1, so that communication between the HeNB 100-1 and the UE 200-1 is interrupted.

Figure 3:
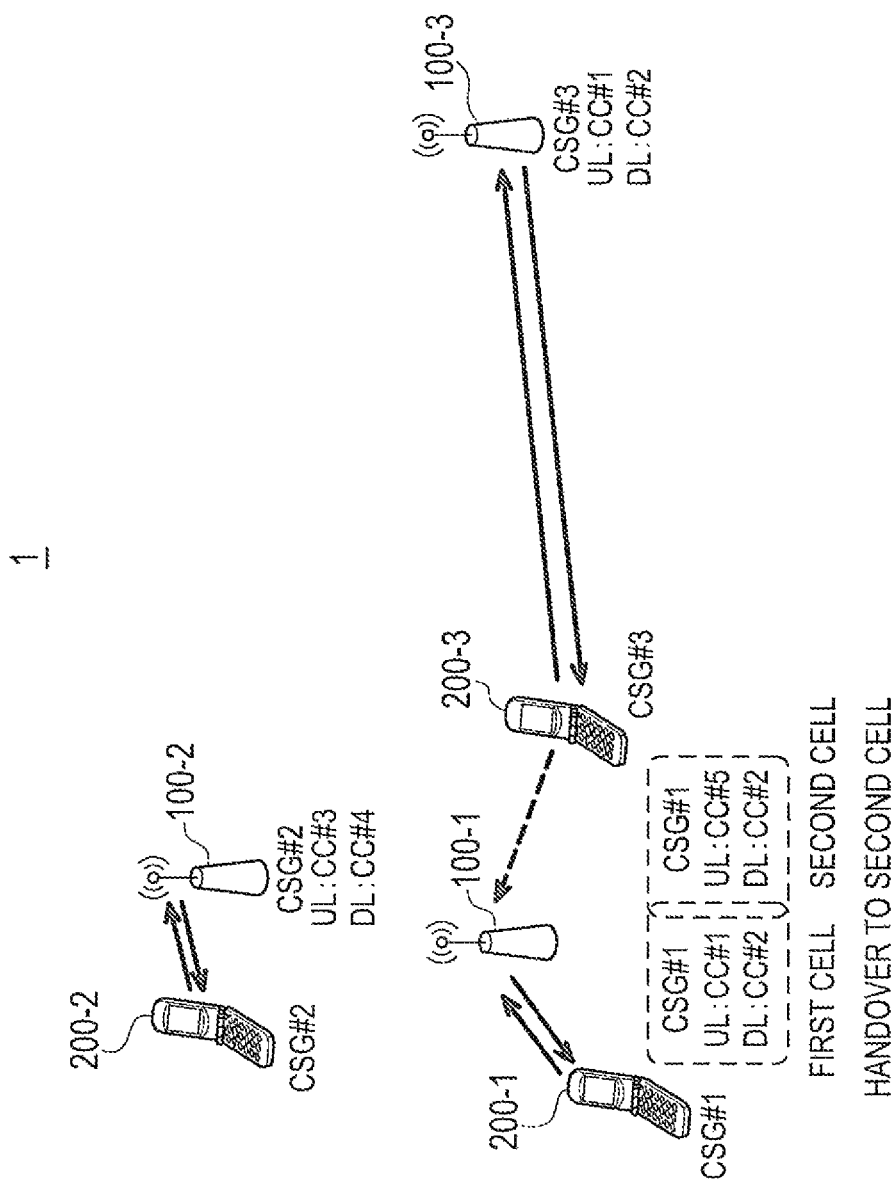
FIG. 3 is a diagram for explaining an operation of the mobile communication system at the time of detection of UL interference.

FIG. 3 is a diagram for explaining the operation of the mobile communication system 1 at the time of detection of UL interference.

As illustrated in FIG. 3, when interference is detected in the UL (that is, when an interference power level exceeds a predetermined level), the HeNB 100-1 according to the present embodiment constitutes a new CSG cell (hereinafter, called "second cell"), in addition to the CSG cell (hereinafter, called "first cell") constituted up to now.

CC (hereinafter, called "UL CC") used in the UL by the second cell is different from that used in the UL by the first cell, and CC (hereinafter, called "DL CC") used in the DL by the second cell is the same as that used in the DL by the first cell. For example, the second cell uses CC#5 in the UL and the CC#1 in the DL. Furthermore, a cell ID of the second cell is different from that of the first cell and a CSG ID of the second cell is the same as that of the first cell.

After the second cell is constituted, the HeNB 100-1 and the UE 200-1 switch the serving cell of the UE 200-1 from the first cell to the second cell by a handover procedure. The handover procedure, for example, is performed according to "10 Mobility" disclosed in Non-Patent Literature 1.

As a consequence, the HeNB 100-1 and the UE 200-1 use another CC (that is, the CC#5) in UL communication, instead of the CC (that is, the CC#1) in which the interference was detected in the UL, so that the interference in the UL is avoided.

Figure 4:
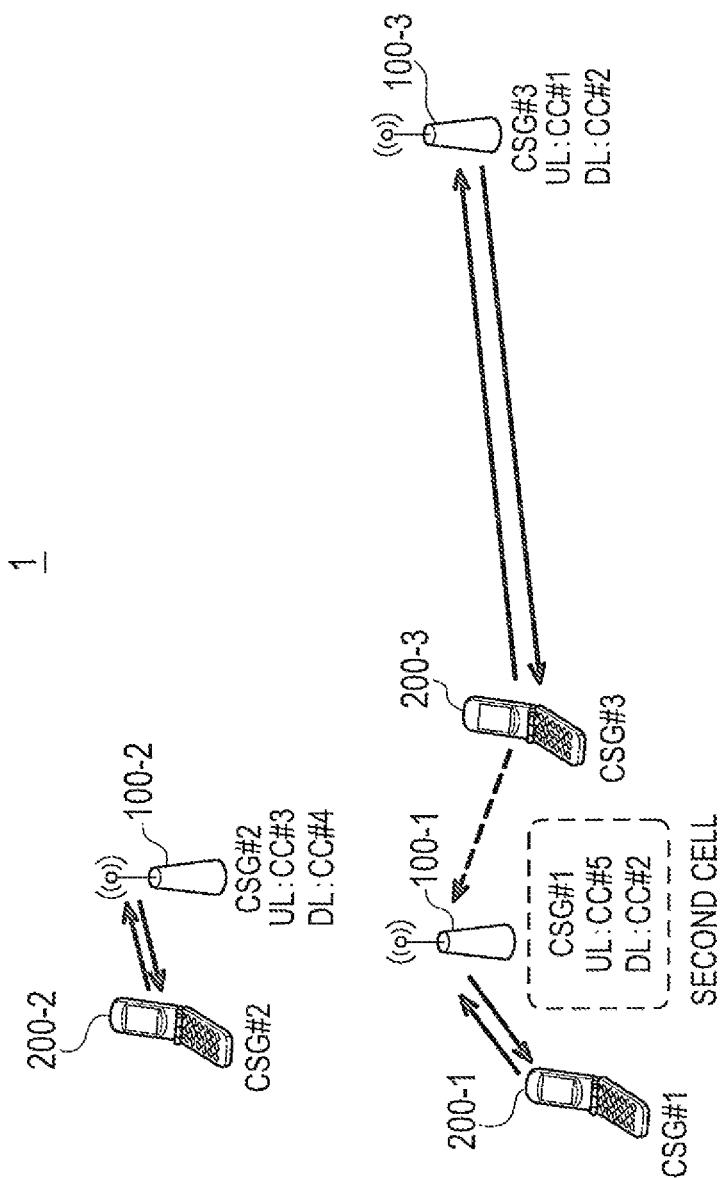
FIG. 4 is a diagram for explaining the operation of the mobile communication system after a handover procedure is completed according to the first embodiment.

FIG. 4 is a diagram for explaining the operation of the mobile communication system 1 after the handover procedure is completed.

As illustrated in FIG. 4, after the serving cell of the UE 200-1 is switched from the first cell to the second cell, the HeNB 100-1 deactivates the first cell. Deactivation of the first cell, for example, indicates that the transmission of a DL signal (including a reference signal, a cell ID, a CSG ID and the like) from the first cell is stopped. In addition, when there are a plurality of UEs 200-1, the HeNB 100-1 switches serving cells of all the UEs 200-1 from the first cell to the second cell, and then deactivates the first cell.

In this way, the interference in the UL is avoided, but interference may occur in the DL between the first cell and the second cell because the first cell and the second cell use the same DL CC.

Therefore, in the present embodiment, the HeNB 100-1 sets to differ the configuration of a radio frame (hereinafter, called "first radio frame") that is used in DL communication by the first cell, from the configuration of a radio frame (hereinafter, called "second radio frame") that is used in the DL communication by the second cell such that the same DL CC is shared in the first cell and the second cell in a time division manner.

Figure 5:
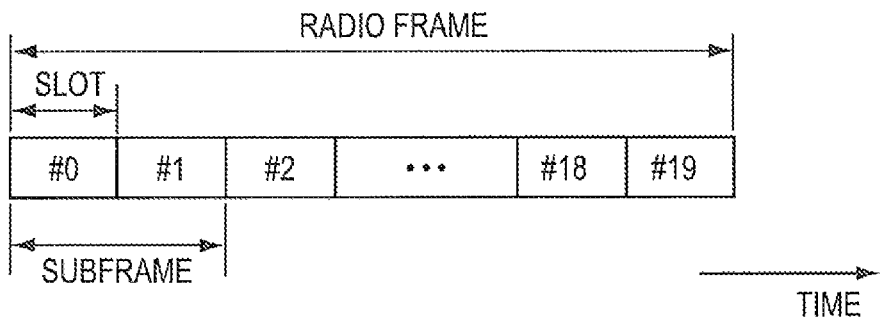
FIG. 5 is a frame configuration diagram of a radio frame in the mobile communication system according to the first embodiment and a second embodiment.

FIG. 5 is a frame configuration diagram of a radio frame in the mobile communication system 1. The radio frame illustrated in FIG. 5 is arranged in a time direction.

As illustrated in FIG. 5, the radio frame includes 10 subframes arranged in the time direction, wherein each subframe includes two slots. Each subframe has a length of 1 ms and each slot has a length of 0.5 ms. A subframe number is assigned orderly to each subframe in the radio frame. Furthermore, each slot includes six or seven OFDM symbols in the time direction and includes a plurality of RBs in a frequency direction.

The HeNB 100 transmits a DL broadcast signal in a specific subframe of the radio frame. The DL broadcast signal is, for example, a synchronization signal and system information. The synchronization signal includes a primary synchronization signal (PSS) an a secondary synchronization signal (SSS).

The PSS is mapped to the last OFDM symbol in each slot of the subframes with a subframe number #0 and a subframe number #5, and the SSS is mapped to the second OFDM symbol from the last (that is, the symbol immediately before the PSS) in the same slot.

When the UE 200 receives the PSS and the SSS normally, the UE 200 can discover the cell and perform synchronization. After the completion of the cell search, when the UE 200 receives the system information from the cell normally, the UE 200 acquires the information necessary for communication within the cell from the system information, and performs the processing (access and registration) for connecting to the cell.

The system information includes a master information block (MIB) and a system information block (SIB). The MIB is transmitted by using a physical broadcast channel (PBCH) mapped to the subframe with the subframe number #0. The MIB includes the information necessary for receiving the SIB. The SIB is transmitted by using a physical downlink shared channel (PDSCH). The SIB includes the information necessary for accessing a cell. SIB1 is mapped to a subframe #5, and SIB2 and beyond are mapped to the subframes specified in the SIB1.

Figure 6:
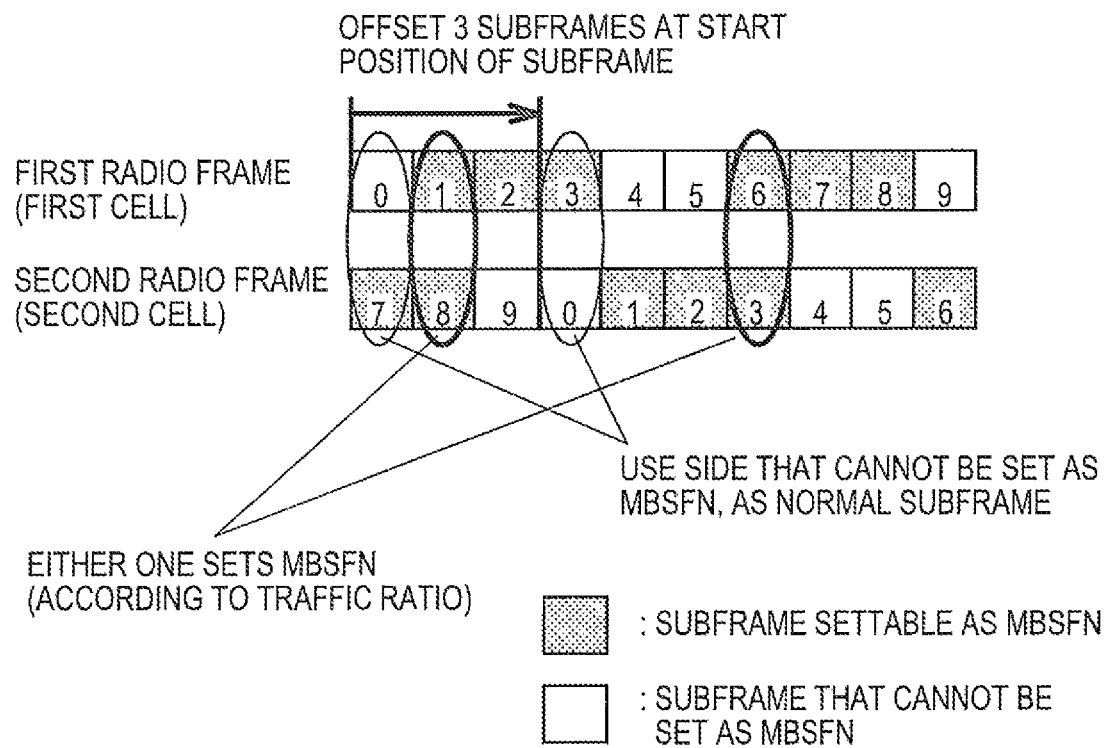
FIG. 6 is a frame configuration diagram each of a first radio frame used in a first cell and a second radio frame used in a second cell according to the first embodiment and the second embodiment.

FIG. 6 is a frame configuration diagram showing each of the first radio frame used in the first cell and the second radio frame used in the second cell. In FIG. 6, a rectangle indicates a subframe and a hatched subframe is a subframe settable as MBSFN (Multicast/Broadcast Single Frequency Network) subframe for MBMS (Multimedia Broadcast Multicast Services). In contrast, the un-hatched subframes are subframes that cannot be set as MBSFN subframes (hereinafter, called "non-MBSFN subframes"). The frame configuration illustrated in FIG. 6 is applied to at least a period until the first cell is deactivated after the second cell is constituted (activated).

The first radio frame includes the first MBSFN subframes (subframe numbers #1, #2, #3, #6, #7, and #8) and the first non-MBSFN subframes (subframe numbers #0, #4, #5, and #9). The second radio frame includes the second MBSFN subframes (subframe numbers #1, #2, #3, #6, #7, and #8) and the second non-MBSFN subframes (subframe numbers #0, #4, #5, and #9).

The HeNB 100-1 sets each of the frame configurations of the first radio frame and the second radio frame such that first non-MBSFN subframes (subframe numbers #0, #4, #5, and #9 of the first radio frame) and second MBSFN subframes (subframe numbers #1, #2, #6, and #7 of the second radio frame) overlap on a time axis, and second non-MBSFN subframes (subframe numbers #0, #4, #5, and #9 of the second radio frame) and first MBSFN subframes (subframe numbers #2, #3, #7, and #8 of the first radio frame) overlap on the time axis.

As a result, normal communication with the UE 200 can be performed in the non-MBSFN subframe in one radio frame, and the subframe that overlaps the non-MBSFN subframe in the other radio frame cannot perform normal communication as the MBSFN subframe. As a consequence, a single downlink carrier can be shared by the first cell and the second cell in a time division manner.

In FIG. 6, some of the MBSFN subframes (subframe numbers #1 and #6) of the first radio frame and some of the MBSFN subframes (subframe numbers #8 and #3) of the second radio frame overlap on the time axis. Of the MBSFN subframes that overlap on the time axis, some MBSFN subframes can be set as normal subframes (non-MBSFN subframes).

In the present embodiment, on the basis of a traffic situation in each of the first cell and the second cell, the HeNB 100-1 sets the frame configurations of the first radio frame and the second radio frame again such that a time division ratio is adjusted. In detail, the MBSFN subframes that overlap on the time axis, the MBSFN subframes corresponding to the cell with a higher traffic are set as normal subframes (non-MBSFN subframes). As a result, between the first cell and the second cell, in a cell in which traffic is large, it is possible to use many more normal subframes (non-MBSFN subframes), resulting in an increase in communication capacity.

As described above, it is noted that the first radio frame includes the subframes (hereinafter, called "first specific subframes") that should transmit the DL broadcast signal (MIB/SIB/PSS/SSS), and the second radio frame includes the subframes (hereinafter, called "second specific subframes") that should transmit the DL broadcast signal (MIB/SIB/PSS/SSS). In detail, the first specific subframes are the subframes with the subframe numbers #0 and #5 of the first radio frame, and the second specific subframes are the subframes with the subframe numbers #0 and #5 of the second radio frame.

The HeNB 100-1 sets each of the frame configurations of the first radio frame and the second radio frame such that the first specific subframes and the second specific subframes do not overlap on the time axis. That is, the HeNB 100-1 sets the frame configurations such that subframes that should transmit the DL broadcast signal (MIB/SIB/PSS/SSS) do not overlap in the first radio frame and the second radio frame.

In the present embodiment, the HeNB 100-1 sets subframe numbers of each of a plurality of first subframe and a plurality of second subframe to be shifted by a predetermined subframe number such that the first specific subframes and the second specific subframes do not overlap on the time axis. In detail, the subframe number #0 in the second radio frame has an offset of three subframes with reference to the subframe number #0 in the first radio frame.

Figure 7:
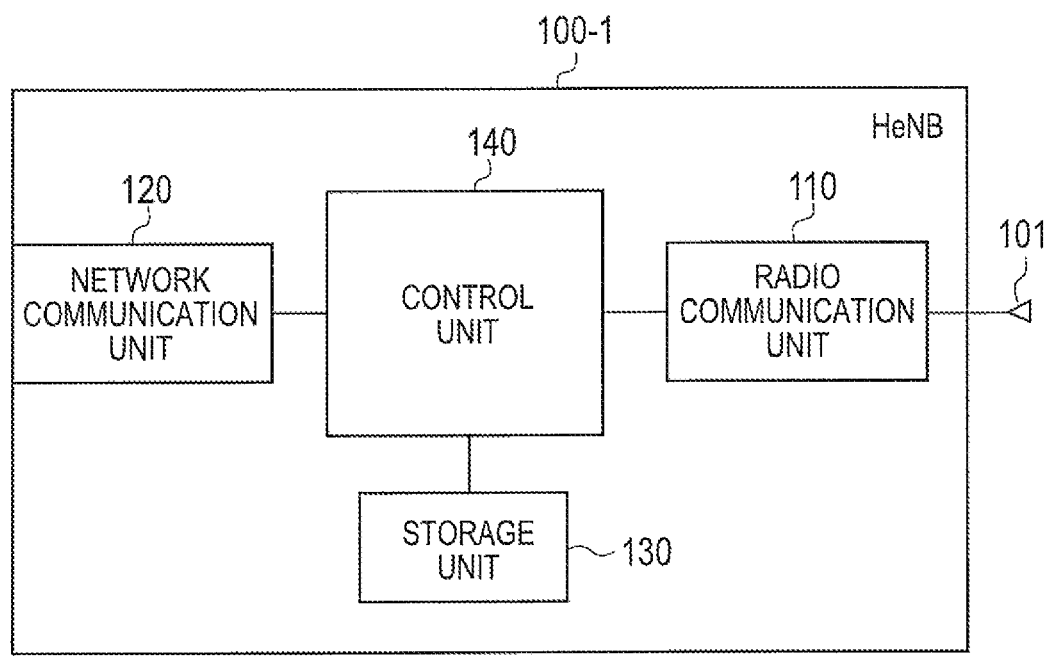
FIG. 7 is a block diagram of HeNB according to the first embodiment and the second embodiment.

Next, the configuration of the HeNB 100 will be described. Since the HeNB 100-1 to the HeNB 100-3 have the same configuration, the configuration of the HeNB 100-1 will be described below. FIG. 7 is a block diagram of the HeNB 100-1.

As illustrated in FIG. 7, the HeNB 100-1 includes an antenna 101, a radio communication unit 110, a network communication unit 120, a storage unit 130, and a control unit 140.

The radio communication unit 110 is configured to perform radio communication via the antenna 101. For transmission, the radio communication unit 110 performs up-conversion, amplification and the like on a baseband signal input from the control unit 140, and outputs a radio signal from the antenna 101. For reception, the radio communication unit 110 performs amplification, down-conversion and the like on a received signal input from the antenna 101, and then outputs a baseband signal to the control unit 140.

The network communication unit 120 communicates with a core network (Evolved Packet Core: EPC) by using an S1 interface. Furthermore, the network communication unit 120 performs communication (inter-base station communication) with another HeNB by using an X2 interface.

The storage unit 130 is configured by using a memory, for example, and stores various types of information used for control and the like by the control unit 140. The storage unit 130 stores information on each CC (the CC#1 to CC#N) available in the mobile communication system, for example, information on a center frequency of each CC (the CC#1 to CC#N), a bandwidth of each CC (the CC#1 to CC#N) and the like. The storage unit 130 stores a CSG ID for identifying CSG (that is, the CSG#1) including the HeNB 100-1, and a cell ID of each of the first cell and the second cell.

The control unit 140 is configured by using a processor, for example, and controls various functions of the HeNB 100.

When the HeNB 100-1 is powered on, the control unit 140 measures (monitors) the state of a radio signal, which is received by the radio communication unit 110, for each CC on the basis of the information on the CC stored in the storage unit 130, and determines CC used around the HeNB 100-1. Then, the control unit 140 decides CC, which is different from the CC used around the HeNB 100-1, as CC to be used in the HeNB 100-1. In addition, the control unit 140 periodically performs the monitoring even after deciding UL CC and DL CC.

After deciding the UL CC and the DL CC, the control unit 140 controls the radio communication unit 110 to periodically broadcast information (information on a center frequency and a bandwidth) indicating the UL CC and information (information on a center frequency and a bandwidth) indicating the DL CC as an information element (IE) of SIB within the cell of the HeNB 100-1. Furthermore, the control unit 140 controls the radio communication unit 110 to periodically broadcast the cell ID and the CSG ID of the cell (the first cell) constituted by the HeNB 100-1.

After the UE 200-1 is accommodated in the first cell, the control unit 140 assigns RB for each of the UL and the DL to the UE 200-1 by a scheduler function. Specifically, the control unit 140 decides RB to be assigned to the UE 200-1 from a plurality of RBs included in the UL CC of the first cell, and decides RB to be assigned to the UE 200-1 from a plurality of RBs included in the DL CC of the first cell. Then, the control unit 140 controls the radio communication unit 110 to transmit each of the decided UL and DL assigned RBs to the UE 200-1 on the physical downlink control channel (PDCCH).

After the UE 200-1 is accommodated in the first cell, the control unit 140 measures an interference power level in the UL CC of the first cell on the basis of a reception state in the radio communication unit 110. When the interference power level exceeds a predetermined level, the control unit 140 decides the UL CC of the second cell. Specifically, on the basis of a result obtained by monitoring a peripheral CC use status, the control unit 140 decides CC, which is not used around the HeNB 100-1, or CC with a low UL interference power level as the UL CC of the second cell.

In addition, the control unit 140 may decide the UL CC of the second cell on the basis of a result of the monitoring performed when the HeNB 100-1 is powered on, or may decide the UL CC of the second cell on the basis of a result of monitoring that is periodically performed. Alternatively, after deciding handover to the second cell, the control unit 140 may perform monitoring again, and decide the UL CC of the second cell on the basis of a result of the monitoring. Hereinafter, a description will be provided for the case of deciding the UL CC of the second cell on the basis of a result of the monitoring that is periodically performed.

When the UL CC of the second cell is decided, the control unit 140 constitutes (activates) the second cell and sets each of the frame configurations of the aforementioned first radio frame and second radio frame. The activation of the second cell indicates a process of controlling the radio communication unit 110 to start the transmission of a DL signal (including a reference signal, a cell ID, a CSG ID and the like) from the second cell and the transmission of CC information (information on a center frequency and a bandwidth of each of the UL CC and the DL CC of the second cell) from the second cell. The CC information from the second cell is transmitted as the IE of the SIB.

Furthermore, the control unit 140 controls the radio communication unit 110 to transmit, in the first cell, information indicating the changed frame configuration of the first radio frame and transmit, in the second cell, information indicating the frame configuration of the second radio frame. The information indicating the frame configuration indicates information on a list of the subframe numbers of the aforementioned MBSFN subframes or an offset of the aforementioned subframes.

Moreover, the control unit 140 performs measurement control for the UE 200-1. For example, the control unit 140 controls the radio communication unit 110 to transmit, to the UE 200-1, measurement control information for controlling a measurement report process to be omitted. The measurement report process is a process for the handover procedure and a process for reporting a measurement result of the reception state in the UE 200-1 to the serving cell. As described above, since the UE 200-1 performs handover to the second cell, the measurement report process is not necessary. Thus, it is possible to reduce overhead by omitting the measurement report process.

Alternatively, instead of omitting the measurement report process, the control unit 140 may also control the radio communication unit 110 to transmit, to the UE 200-1, an offset value by which the measurement result for the second cell is higher than the measurement result for the first cell. When a measurement report indicating that the measurement result for the second cell is higher than the measurement result for the first cell is received from the UE 200-1, it is possible to perform handover of the UE 200-1 to the second cell according to a normal handover procedure.

Then, the control unit 140 starts the handover procedure of the UE 200-1.

Firstly, the control unit 140 controls the radio communication unit 110 to performs acceptance preparation of the UE 200-1 in the second cell. Specifically, a predetermined communication context in the first cell is took over to the second cell, and the second cell ensures RB for the UE 200-1.

Secondly, the control unit 140 controls the radio communication unit 110 to transmit, to the UE 200-1, a handover command for instructing handover to the second cell.

Thirdly, the control unit 140 controls the UE 200-1, which accesses the second cell by the handover command, to be accommodated in the second cell. As a consequence, the serving cell of the UE 200-1 is switched from the first cell to the second cell.

When there are a plurality of UEs 200-1, the control unit 140 performs the handover procedure for each of the UE 200-1. In this case, on the basis of a communication state of each of the plurality of UEs 200-1, the control unit 140 controls the serving cell of the UE 200-1 with high priority among the plurality of UEs 200-1 to be preferentially switched. This may result from a possibility that when the plurality of UEs 200-1 simultaneously perform handover, a handover failure occurs due to an increase in overhead and processing load. In addition, the UE 200-1 with high priority, for example, indicates the UE 200-1 having not entered a DRX state, the UE 200-1 with a large buffer amount notified through a buffer status report (BSR), or the UE 200-1 with high QoS indicated by QCI (QoS Class Identifier).

Furthermore, when there is a handover request or a connection request for new UE in the middle of switching the serving cell from the first cell to the second cell for each of the plurality of UEs 200-1, the control unit 140 controls the new UE to be accommodated in the second cell. Specifically, in the case in which the network communication unit 120 receives a handover request for requiring UE acceptance from an exterior (another HeNB, another eNB and the like) on the X2 interface or the S1 interface, the control unit 140 rejects the handover request when the handover request requires handover to the first cell, and permits the handover request when the handover request requires handover to the second cell. Furthermore, in the case in which the radio communication unit 110 receives access (a connection request) from the new UE, the control unit 140 rejects the access when the access is access to the first cell, and permits the access when the access is access to the second cell.

When the serving cells of all the UEs 200-1 are switched to the second cell and there is no UE 200-1 accommodated in the first cell, the control unit 140 stops the transmission of the DL signal (including a reference signal, a cell ID, a CSG ID and the like) from the first cell, thereby deactivating the first cell.

Then, the control unit 140 initializes the setting of the MBSFN subframes in the second radio frame that is used in the second cell, thereby controlling at least apart of the MBSFN subframes to be used as normal subframes (non-MBSFN subframes). Furthermore, the control unit 140 controls the radio communication unit 110 to transmit, in the second cell, information indicating the frame configuration of the second radio frame after the initialization.

Figure 8:
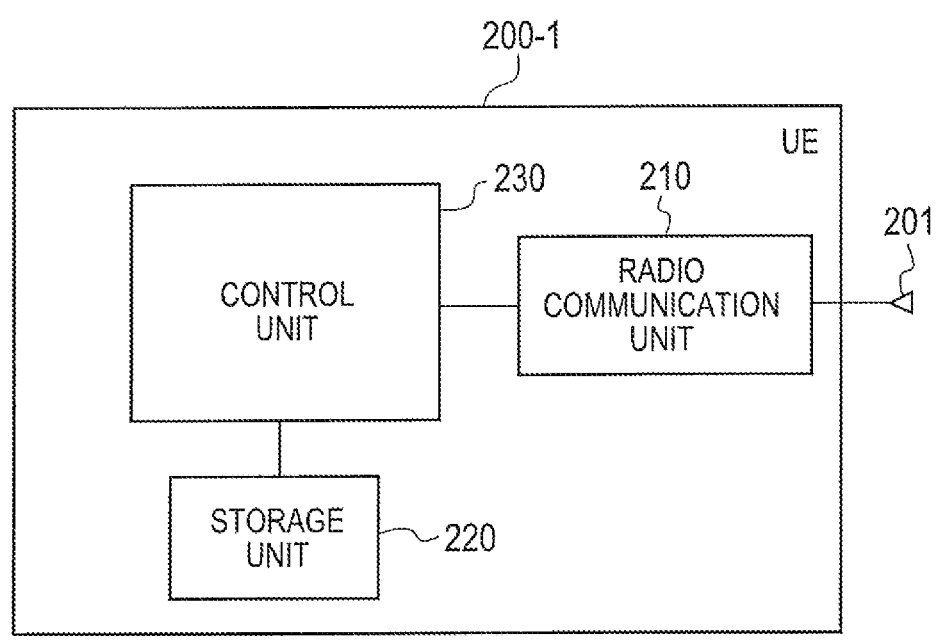
FIG. 8 is a block diagram of UE according to the first embodiment and the second embodiment.

Next, the configuration of the UE 200 is explained. Since the UE 200-1 to the UE 200-3 have the same configuration, the configuration of the UE 200-1 will be described below. FIG. 8 is a block diagram of the UE 200-1.

As illustrated in FIG. 8, the UE 200 includes an antenna 201, a radio communication unit 210, a storage unit 220, and a control unit 230.

The radio communication unit 210 is configured to perform radio communication through the antenna 201. For transmission, the radio communication unit 210 performs up-conversion, amplification and the like on a baseband signal input from the control unit 230, and outputs a radio signal from the antenna 201. For reception, the radio communication unit 210 performs amplification, down-conversion and the like on a received signal input from the antenna 201, and then outputs a baseband signal to the control unit 230.

The storage unit 220 is configured by using a memory, for example, and stores various types of information used for control and the like by the control unit 230. Furthermore, the storage unit 220 stores a CSG ID of CSG (that is, the CSG#1) including the UE 200-1.

The control unit 230 is configured by using a processor, for example, and controls various functions of the UE 200-1.

The control unit 230 measures the state of a radio signal received by the radio communication unit 210, and acquires a cell ID and a CSG ID included in the radio signal. Then, the control unit 230 decides a cell (the first cell constituted by the HeNB 100-1), in which radio communication is possible and a CSG ID coinciding with the CSG ID stored in the storage unit 220 is transmitted, as a serving cell, and attempts a connection. Furthermore, the control unit 230 acquires SIB received from the first cell by the radio communication unit 210, and determines UL CC and DL CC of the second cell on the basis of the SIB.

After the UE 200-1 is accommodated in the first cell, the control unit 230 determines assigned RB on the basis of assignment information received from the first cell by the radio communication unit 210 on the PDCCH, and controls the radio communication unit 210 to perform communication (data transmission and reception) by using the assigned RB.

When the radio communication unit 210 receives SIB including the information indicating the changed frame configuration of the first radio frame from the first cell, the control unit 230 controls the radio communication unit 210 to perform communication in the normal subframes (the non-MBSFN subframes) of the first radio frame. The information indicating the frame configuration includes a list of subframe numbers of the MBSFN subframes of the first radio frame and the like.

Moreover, when the radio communication unit 210 receives the measurement control information for controlling the measurement report process to be omitted from the first cell, the control unit 230 controls the measurement report process to be omitted. As described above, the measurement report process is a process for the handover procedure and a process for reporting the measurement result of the reception state in the UE 200-1 to the serving cell.

Alternatively, when the radio communication unit 210 receives the offset value, by which the measurement result for the second cell is higher than the measurement result for the first cell, from the first cell, the control unit 230 adds the offset value to the measurement result for the second cell or subtracts the offset value from the measurement result for the first cell, thereby controlling the radio communication unit 210 to transmit a measurement report, which indicates that the measurement result for the second cell is higher than the measurement result for the first cell, to the first cell.

Then, when the radio communication unit 210 receives, from the first cell, a command instructing handover to the second cell, the control unit 230 controls the radio communication unit 210 to receive SIB from the second cell. Then, on the basis of the CC information (the information on the center frequency and the bandwidth of each of the UL CC and the DL CC of the second cell) included in the SIB, and the information indicating the frame configuration of the second radio frame, the control unit 230 accesses the second cell to control the radio communication unit 210 to perform a connection process with the second cell. Furthermore, the control unit 230 controls the connection with the first cell to be disconnected.

After the UE 200-1 is accommodated in the second cell, when the radio communication unit 210 receives the information indicating the frame configuration of the second radio frame after the initialization from the second cell, the control unit 230 controls the radio communication unit 210 to perform communication in the normal subframes (the non-MBSFN subframes) of the second radio frame.

Next, the operation of the mobile communication system according to the present embodiment will be described in sequence of the operation of the HeNB 100-1 and the operation of the UE 200-1. Hereinafter, a description will be provided for an operation in which the UE 200-1 is handed over to the second cell when communication is performed between the first cell of the HeNB 100-1 and the UE 200-1.

Figure 9:
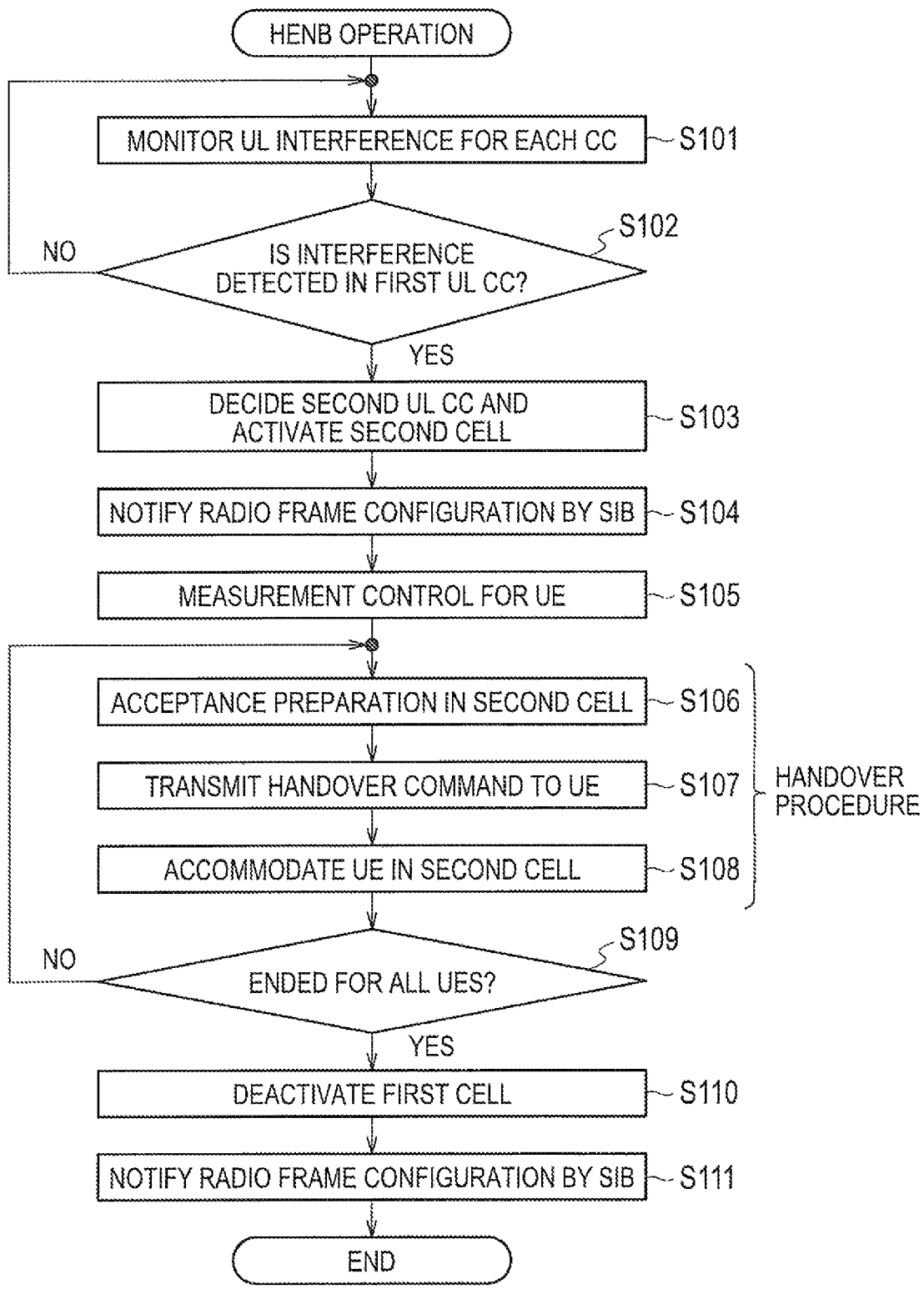
FIG. 9 is an operation flow diagram of the HeNB according to the first embodiment.

FIG. 9 is an operation flow diagram of the HeNB 100-1 according to the present embodiment.

As illustrated in FIG. 9, in step S101, after the UE 200-1 is accommodated in the first cell, the control unit 140 monitors a UL interference power level for each CC on the basis of a reception state in the radio communication unit 110.

In step S102, the control unit 140 confirms whether the interference power level in the UL CC (the first UL CC) of the first cell exceeds a predetermined level. When the interference power level in the UL CC of the first cell exceeds the predetermined level (step S102; YES), the procedure proceeds to step S103. On the other hand, when the interference power level in the UL CC of the first cell does not exceed the predetermined level (step S102; NO), the procedure returns to step S101.

In step S103, the control unit 140 decides CC not used around the HeNB 100-1 or CC with a low UL interference power level as the UL CC (the second UL CC) of the second cell on the basis of the monitoring result in step S101. Furthermore, the control unit 140 constitutes (activates) the second cell and sets the frame configurations of the aforementioned first radio frame and second radio frame.

In step S104, the control unit 140 controls the radio communication unit 110 to transmit, in the first cell, information indicating the frame configuration of the first radio frame after change and transmit, in the second cell, information indicating the frame configuration of the second radio frame.

In step S105, the control unit 140 performs measurement control for the UE 200-1. For example, the control unit 140 controls the radio communication unit 110 to transmit, to the UE 200-1, measurement control information for controlling a measurement report process to be omitted. Alternatively, instead of omitting the measurement report process, the control unit 140 may also control the radio communication unit 110 to transmit, to the UE 200-1, an offset value by which the measurement result for the second cell is higher than the measurement result for the first cell.

In step S106 to step S108, the control unit 140 performs a handover procedure of the UE 200-1.

Firstly, in step S106, the control unit 140 performs acceptance preparation of the UE 200-1 in the second cell.

Secondly, in step S107, the control unit 140 controls the radio communication unit 110 to transmit, to the UE 200-1, the handover command for instructing handover to the second cell.

Thirdly, in step S108, the control unit 140 controls the UE 200-1, which accesses the second cell by the handover command, to be accommodated in the second cell. As a consequence, the serving cell of the UE 200-1 is switched from the first cell to the second cell.

In step S109, the control unit 140 confirms whether the handover procedure to the second cell was ended for all UEs 200-1. When the handover procedure to the second cell was ended for all the UEs 200-1 (step S109; YES), the procedure proceeds to step S110. On the other hand, when there is the UE 200-1 for which the handover procedure to the second cell is not ended (step S109; NO), the procedure returns to step S106 and the handover procedure is performed for the UE 200-1.

In addition, when the handover procedure of a plurality of UEs 200-1 is performed, the control unit 140 controls the serving cell of the UE 200-1 with high priority among the plurality of UEs 200-1 to be preferentially switched on the basis of a communication state of each of the plurality of UEs 200-1.

In step S110, the control unit 140 stops the transmission of the DL signal (including a reference signal, a cell ID, a CSG ID and the like) from the first cell, thereby deactivating the first cell.

In step S111, the control unit 140 initializes the setting of the MBSFN subframes in the second radio frame, thereby controlling at least a part of the MBSFN subframes to be used as normal subframes (non-MBSFN subframes). Then, the control unit 140 controls the radio communication unit 110 to transmit, in the second cell, information indicating the frame configuration of the second radio frame after the initialization.

In addition, in step S103 to step S109, when there is a handover request or a connection request for new UE, the control unit 140 controls the new UE to be accommodated in the second cell.

Figure 10:
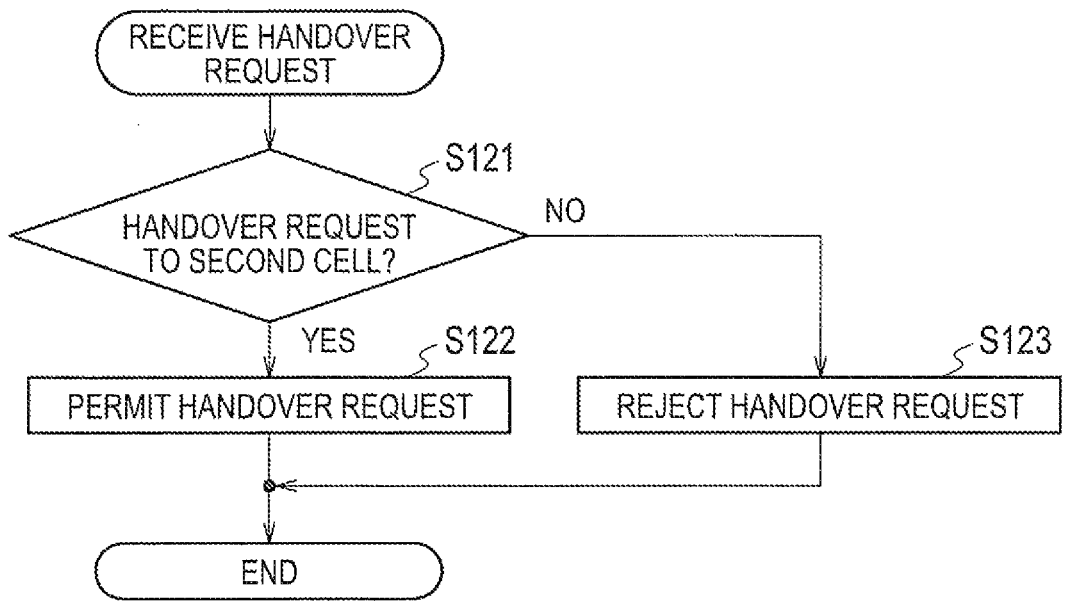
FIG. 10 is an operation flow diagram of the HeNB when there is a handover request for new UE in step S103 to step S109 of FIG. 9.

FIG. 10 is an operation flow diagram of the HeNB 100-1 when there is the handover request for the new UE in step S103 to step S109. Specifically, the network communication unit 120 receives a handover request for requiring UE acceptance from an exterior (another HeNB, another eNB and the like) on the X2 interface or the S1 interface.

As illustrated in FIG. 10, in step S121, the control unit 140 confirms whether the handover request requires handover to the second cell on the basis of a cell ID of a target cell included in the handover request received by the network communication unit 120. When the handover request requires the handover to the second cell (step S121; YES), the procedure proceeds to step S122. On the other hand, when the handover request requires handover to the first cell (step S121; NO), the procedure proceeds to step S123.

In step S122, the control unit 140 determines to permit the handover request, and controls the network communication unit 120 to transmit an acknowledgment (ACK) for the handover request to a transmission source of the handover request on the X2 interface or the S1 interface.

Meanwhile, in step S123, the control unit 140 determines to reject the handover request, and controls the network communication unit 120 to transmit a negative acknowledgment (NACK) for the handover request to the transmission source of the handover request on the X2 interface or the S1 interface.

Figure 11:
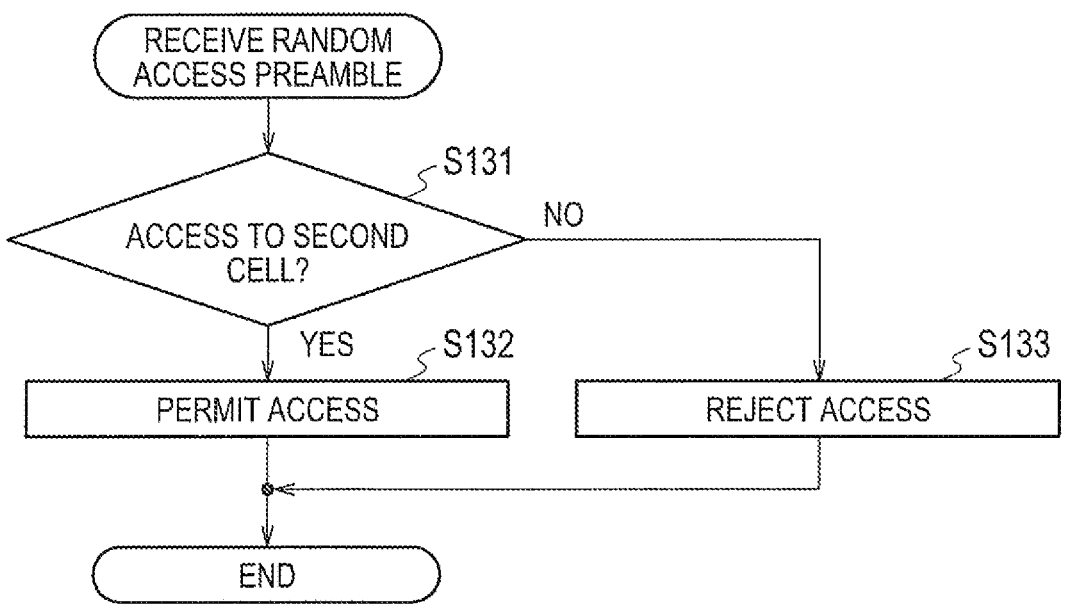
FIG. 11 is an operation flow diagram of the HeNB when there is access (a connection request) from the new UE in step S103 to step S109 of FIG. 9.

FIG. 11 is an operation flow diagram of the HeNB 100-1 when there is access (the connection request) for the new UE in step S103 to step S109. Specifically, the radio communication unit 110 receives a random access preamble for the first cell or the second cell from the new UE.

As illustrated in FIG. 11, in step S131, the control unit 140 confirms whether the random access preamble requires access to the second cell on the basis of the random access preamble received by the radio communication unit 110. When the random access preamble requires the access to the second cell (step S131; YES), the procedure proceeds to step S132. On the other hand, when the random access preamble requires access to the first cell (step S131; NO), the procedure proceeds to step S133.

In step S132, the control unit 140 determines to permit the random access preamble, and controls the radio communication unit 110 to transmit a random access response, which is an acknowledgment for the random access preamble, to the new UE.

Meanwhile, in step S133, the control unit 140 determines to reject the random access preamble, and controls the radio communication unit 110 to transmit no random access response, which is the acknowledgment for the random access preamble, to the new UE.

Figure 12:
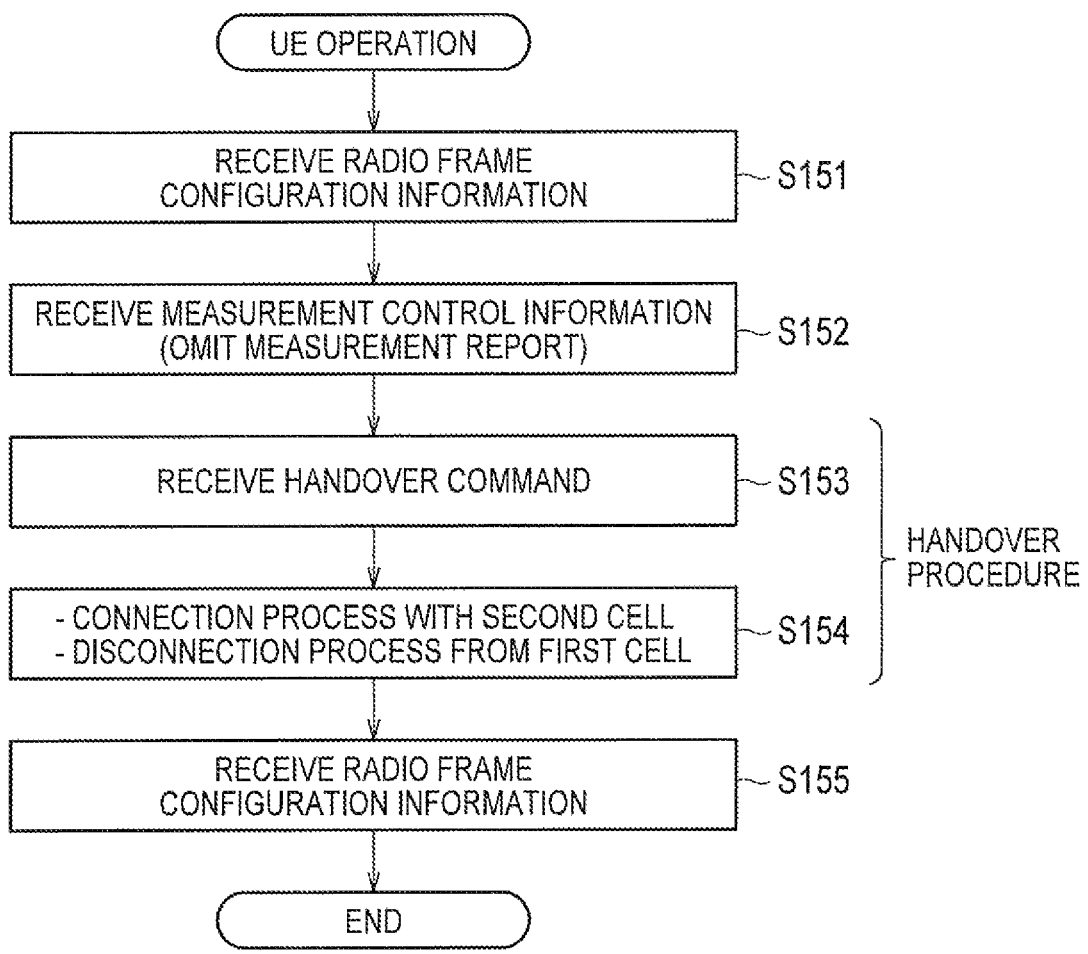
FIG. 12 is an operation flow diagram of the UE according to the second embodiment.

FIG. 12 is an operation flow diagram of the UE 200-1 according to the present embodiment.

As illustrated in FIG. 12, in step S151, when the radio communication unit 210 receives SIB including the information indicating the frame configuration of the first radio frame after change from the first cell, the control unit 230 controls the radio communication unit 210 to perform communication in the normal subframes (the Non-MBSFN subframes) of the first radio frame.

In step S152, when the radio communication unit 210 receives the measurement control information for controlling the measurement report process to be omitted from the first cell, the control unit 230 controls the measurement report process to be omitted. Alternatively, when the radio communication unit 210 receives the offset value, by which the measurement result for the second cell is higher than the measurement result for the first cell, from the first cell, the control unit 230 adds the offset value to the measurement result for the second cell or subtracts the offset value from the measurement result for the first cell, thereby controlling the radio communication unit 210 to transmit a measurement report, which indicates that the measurement result for the second cell is higher than the measurement result for the first cell, to the first cell.

In step S153, the radio communication unit 210 receives, from the first cell, a command instructing handover to the second cell.

In step S154, the control unit 230 controls the radio communication unit 210 to receive SIB from the second cell. Then, on the basis of the CC information (the information on the center frequency and the bandwidth of each of the UL CC and the DL CC of the second cell) included in the SIB, and the information indicating the frame configuration of the second radio frame, the control unit 230 accesses the second cell to control the radio communication unit 210 to perform a connection process with the second cell. Furthermore, the control unit 230 controls the connection with the first cell to be disconnected.

In step S155, after the UE 200-1 is accommodated in the second cell, when the radio communication unit 210 receives the information indicating the frame configuration of the second radio frame after the initialization from the second cell, the control unit 230 controls the radio communication unit 210 to perform communication in the normal subframes (the non-MBSFN subframes) of the second radio frame.

As described above, in the mobile communication system employing the FDD scheme, the HeNB 100-1 constitutes the first cell that uses a pair of the first UL CC and DL CC for communication, and the second cell that uses a pair of the second UL CC and the DL CC for communication. When interference is detected in the first UL CC, the HeNB 100-1 and the UE 200-1 switch the serving cell of the UE 200-1 from the first cell to the second cell by the handover procedure. As a result, the second UL CC is used for UL communication instead of the first UL CC in which the interference was detected in the UL, resulting in the avoidance of the interference in the UL.

In addition, after the serving cell of the UE 200-1 is switched from the first cell to the second cell, when interference is detected in the second UL CC, the aforementioned process is performed again, resulting in the avoidance of the interference in the UL.

Second Embodiment

Hereinafter, a second embodiment will be described while focusing on the differences from the first embodiment.

Figure 13:
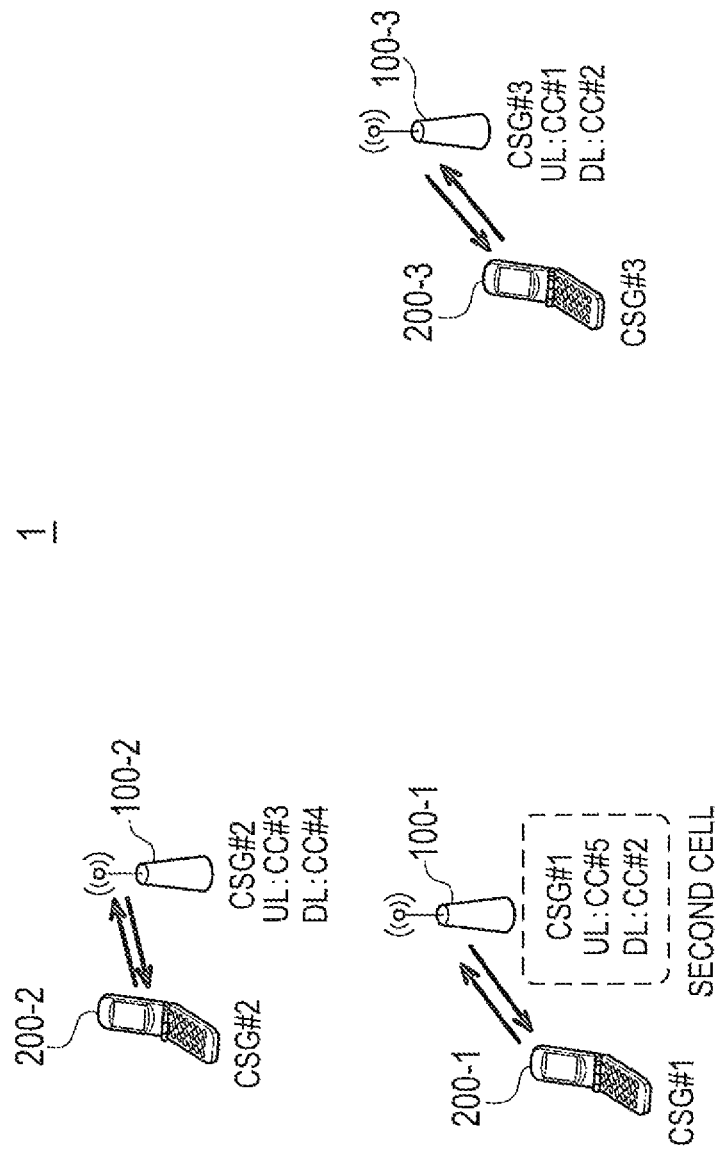
FIG. 13 illustrates an example of a state after a serving cell of the UE is switched from the first cell to the second cell by the handover procedure described in the first embodiment.

FIG. 13 illustrates an example of a state after the serving cell of the UE 200-1 is switched from the first cell to the second cell by the handover procedure described in the first embodiment.

As illustrated in FIG. 13, after the serving cell of the UE 200-1 is switched from the first cell to the second cell by the handover procedure, the UE 200-3, which gives UL interference to the UL CC (the first UL CC) of the first cell, moves remote from the HeNB 100-1.

In this case, since an interference power level in the UL CC (the first UL CC) of the first cell is sufficiently reduced, it is preferable to return to the UL CC decided when power is supplied and keep an initial state harmonized with a neighboring cell.

In this regard, in the present embodiment, after the serving cell of the UE 200-1 is switched from the first cell to the second cell by the handover procedure, when interference in the first UL CC is reduced, the HeNB 100-1 and the UE 200-1 switch the serving cell of the UE 200-1 from the second cell to the first cell by the handover procedure.

Figure 14:
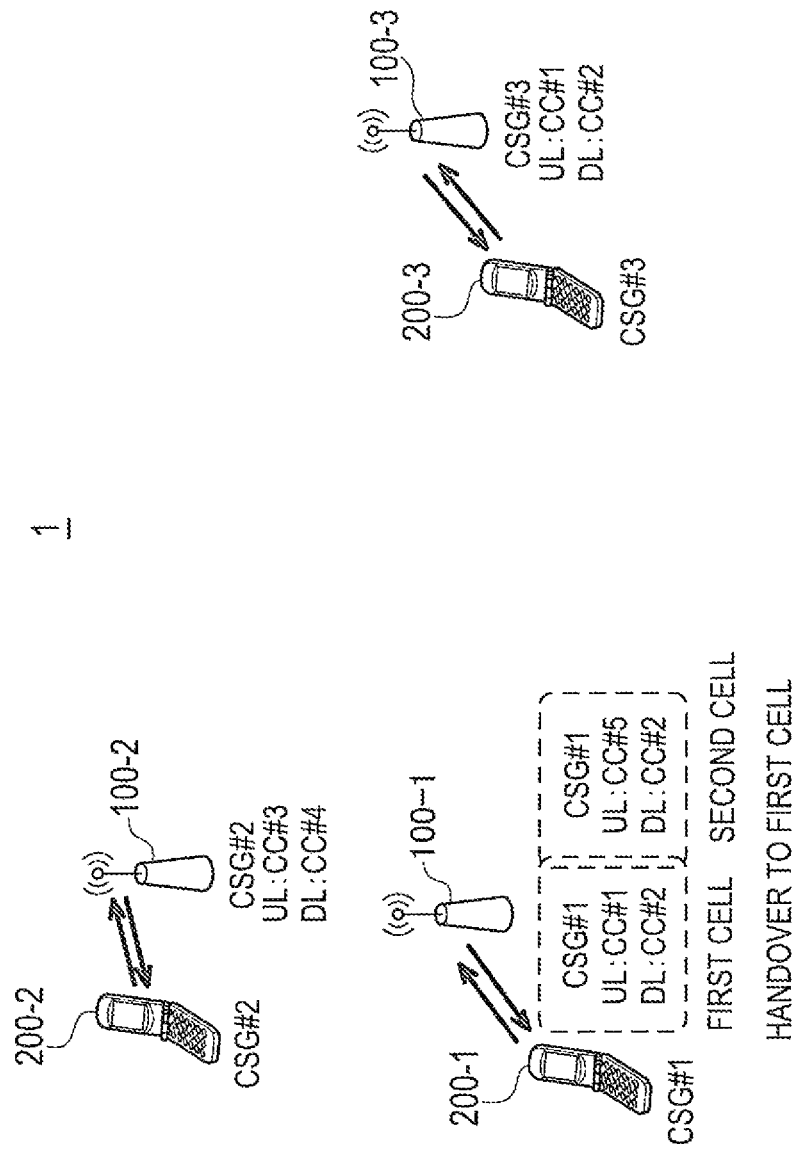
FIG. 14 is a diagram for explaining the operation of the mobile communication system when interference in UL CC (first UL CC) of the first cell is reduced.

FIG. 14 is a diagram for explaining the operation of the mobile communication system 1 when interference in the UL CC (the first UL CC) of the first cell is reduced.

As illustrated in FIG. 14, interference reduction in the first UL CC (that is, the CC#1) is detected (when the interference power level is smaller than a predetermined level), the HeNB 100-1 according to the present embodiment constitutes a first cell in addition to a second cell. The first cell is the same as that described in the aforementioned first embodiment.

After the first cell is constituted, the HeNB 100-1 and the UE 200-1 switch the serving cell of the UE 200-1 from the second cell to the first cell by the handover procedure.

Figure 15:
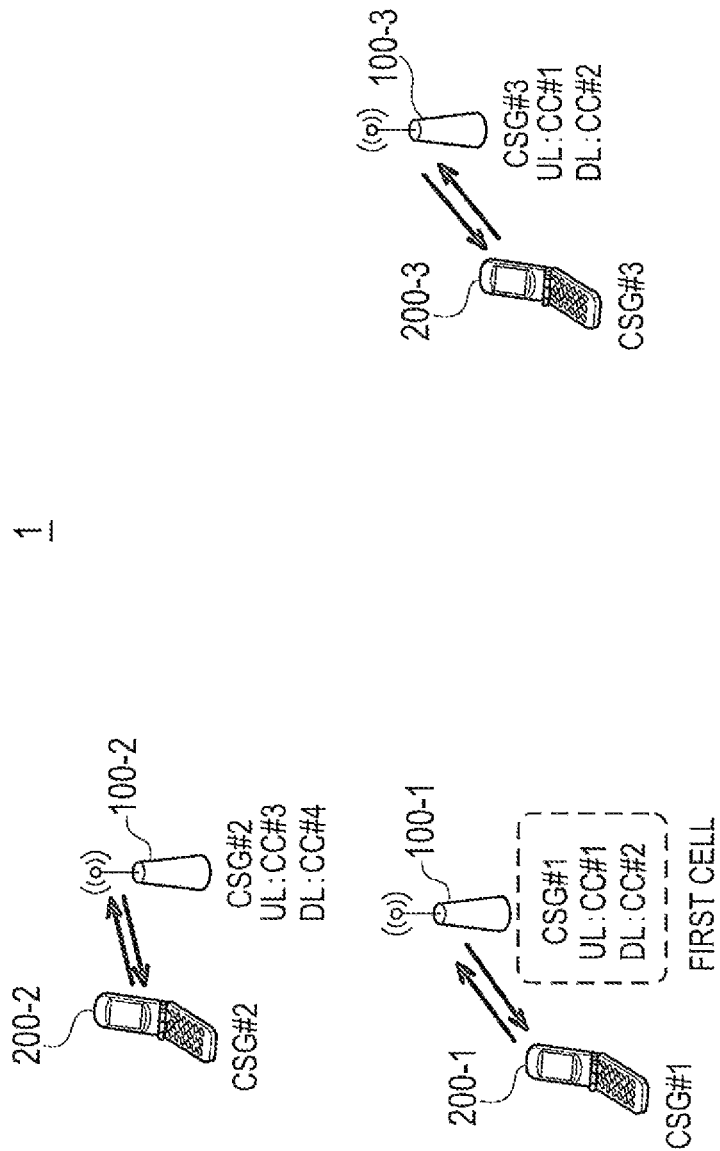
FIG. 15 is a diagram for explaining the operation of the mobile communication system after the handover procedure is completed according to the second embodiment.

FIG. 15 is a diagram for explaining the operation of the mobile communication system 1 after the handover procedure is completed according to the present embodiment.

As illustrated in FIG. 15, after the serving cell of the UE 200-1 is switched from the second cell to the first cell, the HeNB 100-1 deactivates the second cell. The deactivation of the second cell, for example, indicates that the transmission of a DL signal (including a reference signal, a cell ID, a CSG ID and the like) from the second cell is stopped. In addition, when there are a plurality of UEs 200-1, the HeNB 100-1 switches serving cells of all the UEs 200-1 from the second cell to the first cell, and then deactivates the second cell.

In addition, also in the present embodiment, similarly to the first embodiment, in the period during which the first cell and the second cell exist simultaneously, the HeNB 100-1 sets to differ the configuration of the first radio frame, from the configuration of the second radio frame such that the same DL CC is shared in the first cell and the second cell in a time division manner.

Next, the operation of the mobile communication system according to the present embodiment will be described in sequence of the operation of the HeNB 100-1 and the operation of the UE 200-1. Hereinafter, a description will be provided for an operation in which the UE 200-1 is handed over to the first cell when communication is performed between the second cell of the HeNB 100-1 and the UE 200-1.

Figure 16:
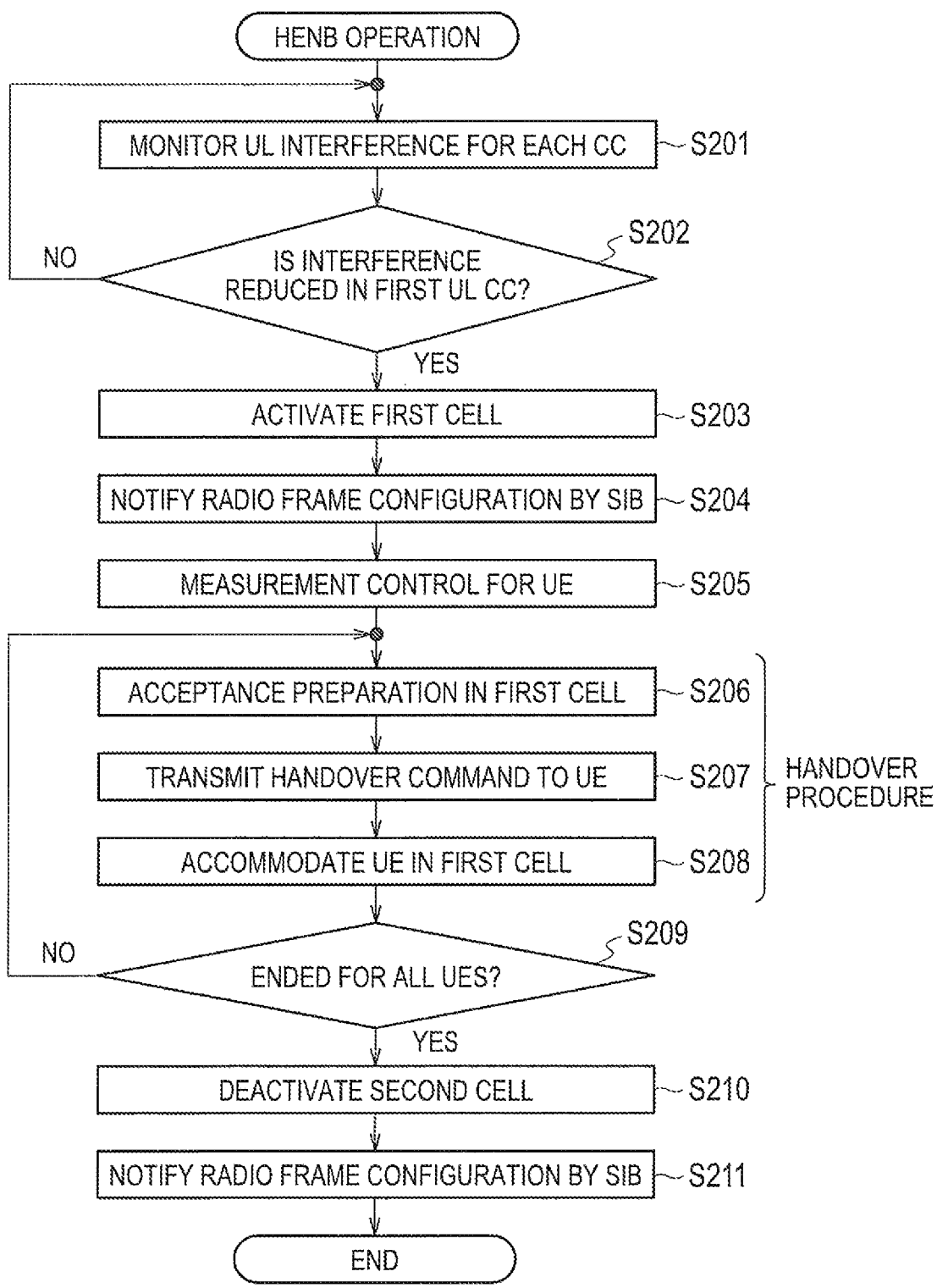
FIG. 16 is an operation flow diagram of the HeNB according to the second embodiment.

FIG. 16 is an operation flow diagram of the HeNB 100-1 according to the present embodiment.

As illustrated in FIG. 16, in step S201, after the UE 200-1 is accommodated in the second cell, the control unit 140 monitors a UL interference power level for each CC on the basis of a reception state in the radio communication unit 110.

In step S202, the control unit 140 confirms whether the interference power level in the UL CC (the first UL CC) of the first cell is lower than a predetermined level. When the interference power level in the first UL CC lower than the predetermined level (step S202; YES), the procedure proceeds to step S203. On the other hand, when the interference power level in the first UL CC is not lower than the predetermined level (step S202; NO), the procedure returns to step S201.

In step S203, the control unit 140 constitutes (activates) the first cell and sets each of the frame configurations of the aforementioned first radio frame and second radio frame.

In step S204, the control unit 140 controls the radio communication unit 110 to transmit, in the second cell, information indicating the frame configuration of the second radio frame after change and to transmit, in the first cell, information indicating the frame configuration of the first radio frame.

In step S205, the control unit 140 performs measurement control for the UE 200-1. For example, the control unit 140 controls the radio communication unit 110 to transmit, to the UE 200-1, measurement control information for controlling a measurement report process to be omitted. Alternatively, instead of omitting the measurement report process, the control unit 140 may also control the radio communication unit 110 to transmit, to the UE 200-1, the offset value by which the measurement result for the first cell is higher than the measurement result for the second cell.

In step S206 to step S208, the control unit 140 performs a handover procedure of the UE 200-1.

Firstly, in step S206, the control unit 140 performs acceptance preparation of the UE 200-1 in the first cell.

Secondly, in step S207, the control unit 140 controls the radio communication unit 110 to transmit, to the UE 200-1, the handover command for instructing handover to the first cell.

Thirdly, in step S208, the control unit 140 controls the UE 200-1, which accesses the first cell by the handover command, to be accommodated in the first cell. As a consequence, the serving cell of the UE 200-1 is switched from the second cell to the first cell.

In step S209, the control unit 140 confirms whether the handover procedure to the first cell was ended for all UEs 200-1. When the handover procedure to the first cell was ended for all the UEs 200-1 (step S209; YES), the procedure proceeds to step S210. On the other hand, when there is the UE 200-1 for which the handover procedure to the first cell is not ended (step S209; NO), the procedure returns to step S206 and the handover procedure is performed for the UE 200-1.

In addition, when the handover procedure of a plurality of UEs 200-1 is performed, the control unit 140 controls the serving cell of the UE 200-1 with high priority among the plurality of UEs 200-1 to be preferentially switched on the basis of a communication state of each of the plurality of UEs 200-1.

In step S210, the control unit 140 stops the transmission of the DL signal (including a reference signal, a cell ID, a CSG ID and the like) from the second cell, thereby deactivating the second cell.

In step S211, the control unit 140 initializes the setting of the MBSFN subframes in the first radio frame, thereby controlling at least a part of the MBSFN subframes to be used as normal subframes (non-MBSFN subframes). Then, the control unit 140 controls the radio communication unit 110 to transmit, in the first cell, information indicating the frame configuration of the first radio frame after the initialization.

In addition, in step S203 to step S209, when there is a handover request or a connection request for new UE, the control unit 140 controls the new UE to be accommodated in the first cell.

Figure 17:
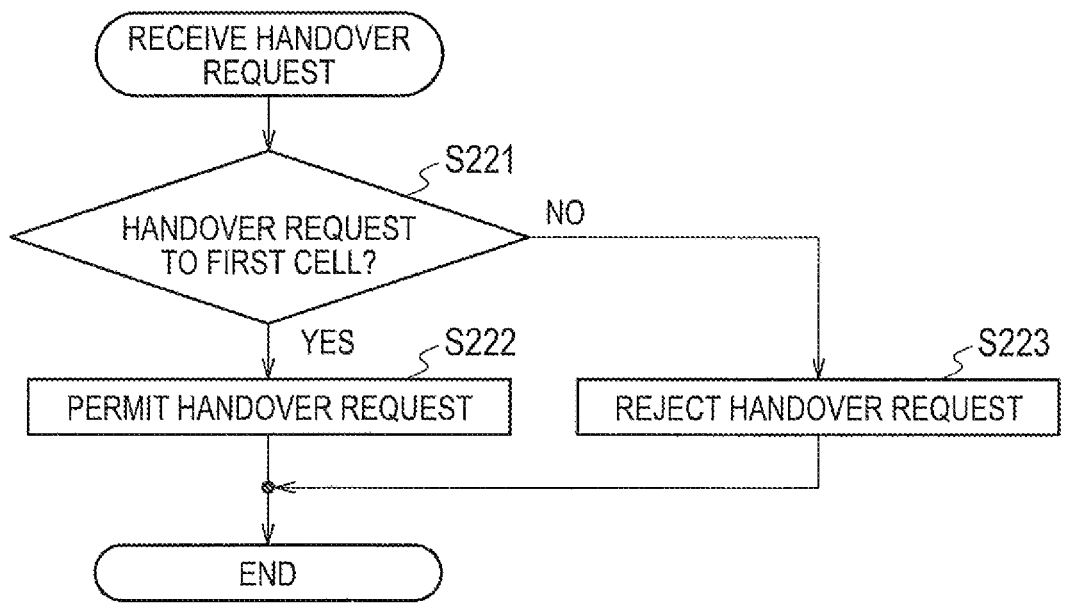
FIG. 17 is an operation flow diagram of the HeNB when there is a handover request for the new UE in step S203 to step S209 of FIG. 16.

FIG. 17 is an operation flow diagram of the HeNB 100-1 when there is the handover request for the new UE in step S203 to step S209. Specifically, the network communication unit 120 receives a handover request for requiring UE acceptance from an exterior (another HeNB, another eNB and the like) on the X2 interface or the S1 interface.

As illustrated in FIG. 17, in step S221, the control unit 140 confirms whether the handover request requires handover to the first cell on the basis of a cell ID of a target cell included in the handover request received by the network communication unit 120. When the handover request requires the handover to the first cell (step S221; YES), the procedure proceeds to step S222. On the other hand, when the handover request requires handover to the second cell (step S221; NO), the procedure proceeds to step S223.

In step S222, the control unit 140 determines to permit the handover request, and controls the network communication unit 120 to transmit an acknowledgment (ACK) for the handover request to a transmission source of the handover request on the X2 interface or the S1 interface.

Meanwhile, in step S223, the control unit 140 determines to reject the handover request, and controls the network communication unit 120 to transmit a negative acknowledgment (NACK) for the handover request to the transmission source of the handover request on the X2 interface or the S1 interface.

Figure 18:
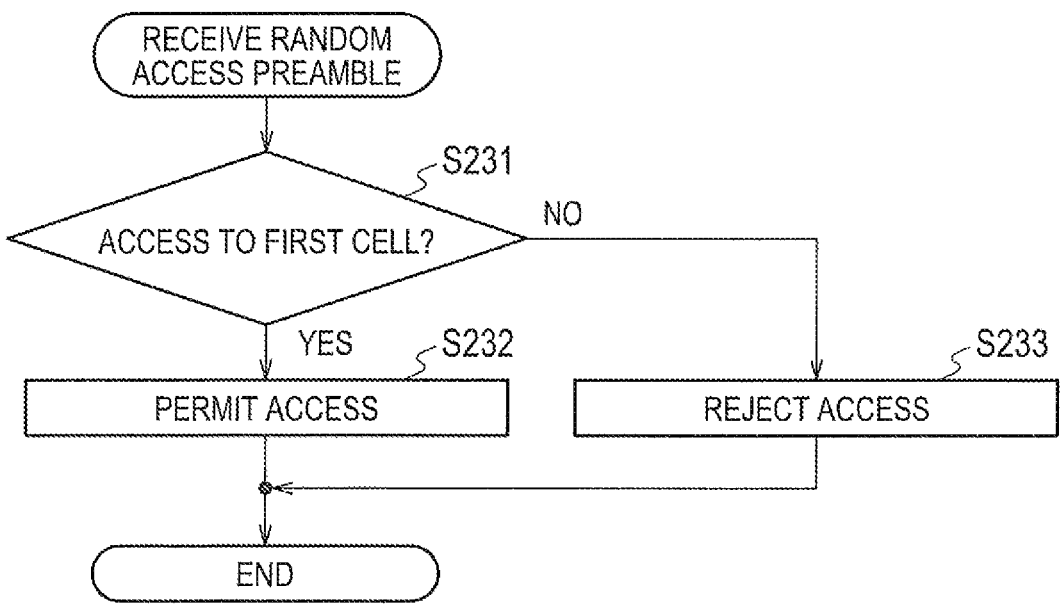
FIG. 18 is an operation flow diagram of the HeNB when there is access (a connection request) from the new UE in step S203 to step S209 of FIG. 16.

FIG. 18 is an operation flow diagram of the HeNB 100-1 when there is access (the connection request) for the new UE in step S203 to step S209. Specifically, the radio communication unit 110 receives a random access preamble for the first cell or the second cell from the new UE.

As illustrated in FIG. 18, in step S231, the control unit 140 confirms whether the random access preamble requires access to the first cell on the basis of the random access preamble received by the radio communication unit 110. When the random access preamble requires the access to the first cell (step S231; YES), the procedure proceeds to step S232. On the other hand, when the random access preamble requires access to the second cell (step S231; NO), the procedure proceeds to step S233.

In step S232, the control unit 140 determines to permit the random access preamble, and controls the radio communication unit 110 to transmit a random access response, which is an acknowledgment for the random access preamble, to the new UE.

Meanwhile, in step S233, the control unit 140 determines to reject the random access preamble, and controls the radio communication unit 110 to transmit no random access response, which is the acknowledgment for the random access preamble, to the new UE.

Figure 19:
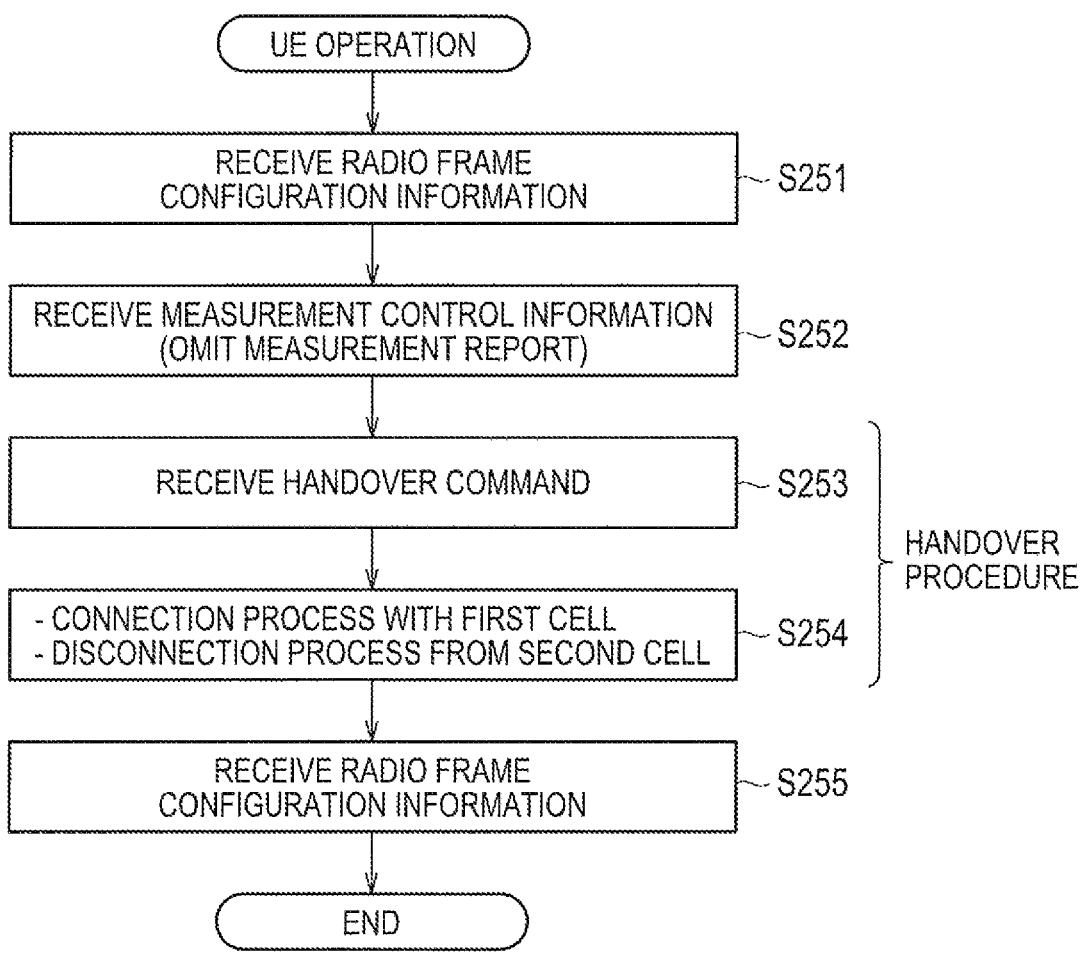
FIG. 19 is an operation flow diagram of the UE according to the second embodiment.

FIG. 19 is an operation flow diagram of the UE 200-1 according to the present embodiment.

As illustrated in FIG. 19, in step S251, when the radio communication unit 210 receives SIB including the information indicating the frame configuration of the second radio frame after change from the second cell, the control unit 230 controls the radio communication unit 210 to perform communication in the normal subframes (the Non-MBSFN subframes) of the second radio frame.

In step S252, when the radio communication unit 210 receives the measurement control information for controlling the measurement report process to be omitted from the second cell, the control unit 230 controls the measurement report process to be omitted. Alternatively, when the radio communication unit 210 receives the offset value, by which the measurement result for the first cell is higher than the measurement result for the second cell, from the second cell, the control unit 230 adds the offset value to the measurement result for the first cell or subtracts the offset value from the measurement result for the second cell, thereby controlling the radio communication unit 210 to transmit a measurement report, which indicates that the measurement result for the first cell is higher than the measurement result for the second cell, to the second cell.

In step S253, the radio communication unit 210 receives, from the second cell, a command instructing handover to the first cell.

In step S254, the control unit 230 controls the radio communication unit 210 to receive SIB from the first cell. Then, on the basis of the CC information (the information on the center frequency and the bandwidth of each of the UL CC and the DL CC of the first cell) included in the SIB, and the information indicating the frame configuration of the first radio frame, the control unit 230 controls the radio communication unit 210 to access the first cell and perform a connection process with the first cell. Furthermore, the control unit 230 controls the connection with the second cell to be disconnected.

In step S255, after the UE 200-1 is accommodated in the first cell, when the radio communication unit 210 receives the information indicating the frame configuration of the first radio frame after the initialization from the first cell, the control unit 230 controls the radio communication unit 210 to perform communication in the normal subframes (the non-MBSFN subframes) of the first radio frame.

As described above, in the mobile communication system employing the FDD scheme, the HeNB 100-1 constitutes the first cell that uses a pair of the first UL CC and DL CC for communication, and the second cell that uses a pair of the second UL CC and the DL CC for communication. After the serving cell of the UE 200-1 is switched from the first cell to the second cell by the handover procedure, when interference in the first UL CC is reduced, the HeNB 100-1 and the UE 200-1 switch the serving cell of the UE 200-1 from the second cell to the first cell by the handover procedure. As a result, it is possible to return to the UL CC decided when power is supplied, so that it is possible to keep an initial state harmonized with a neighboring cell.

Other Embodiments

While the present invention has been described by way of each of the foregoing embodiments, as described above, it should not be understood that the statements and drawings forming a part of this disclosure limit the invention. From this disclosure, a variety of alternate embodiments, examples, and applicable techniques will become apparent to one skilled in the art.

Each of the aforementioned embodiments has described an example in which the handover procedure for changing the UL CC is performed by using interference detection in the UL as a trigger. However, the handover procedure for changing the UL CC may be performed by using congestion detection in the UL as a trigger. For example, when congestion occurs in the UL, the handover procedure is performed such that the UL is changed to UL CC with a wide bandwidth, so that it is possible to solve congestion in the UL due to an increase in UL communication capacity. In addition, the presence or absence of the congestion in the UL, for example, can be determined according to whether an RB use rate in the UL exceeds a predetermined value.

Furthermore, each of the aforementioned embodiments has described the HeNB, which is a kind of a base station, as an example. However, as well as the HeNB, a macro base station (MeNB) or a pico base station (PeNB) may be employed as a base station according to the present invention.

Moreover, in the future, it is also assumed to divide one CC and deal with each divided carrier as new CC. However, a component carrier (CC) in the present specification is assumed to include such new CC.

Thus, it should be understood that the present invention includes various embodiments that are not described herein.

The invention claimed is:

1. A mobile communication system that employs a frequency division duplex scheme, comprising:
one or a plurality of user terminals that communicate with a serving cell; and
a base station that constitutes a first cell and a second cell, wherein
the first cell uses a pair of first uplink carrier and downlink carrier for communication,
the second cell uses a pair of a second uplink carrier and the downlink carrier for communication, and
the base station and the user terminal switch a serving cell of the user terminal between the first cell and the second cell by a handover procedure.

2. The mobile communication system according to claim 1, wherein
the first cell uses a first radio frame for downlink communication,
the second cell uses a second radio frame for downlink communication, and
the base station sets to differ a frame configuration of the first radio frame from a frame configuration of the second radio frame such that the downlink carrier is shared in the first cell and the second cell in time division.

3. The mobile communication system according to claim 2, wherein
the first radio frame includes a first MBSFN subframe and a first non-MBSFN subframe,
the second radio frame includes a second MBSFN subframe and a second non-MBSFN subframe, and
the base station sets the frame configurations of the first radio frame and the second radio frame such that the first non-MBSFN subframe and the second MBSFN subframe overlap on a time axis, and the second non-MBSFN subframe and the first MBSFN subframe overlap on the time axis.

4. The mobile communication system according to claim 2, wherein
on the basis of a traffic situation in each of the first cell and the second cell, the base station sets the frame configurations of the first radio frame and the second radio frame again such that a ratio of the time division is adjusted.

5. The mobile communication system according to claim 2, wherein
the first radio frame includes a first specific subframe that should transmit a downlink broadcast signal,
the second radio frame includes a second specific subframe that should transmit a downlink broadcast signal, and
the base station sets the frame configurations of the first radio frame and the second radio frame such that the first specific subframe and the second specific subframe do not overlap on the time axis.

6. The mobile communication system according to claim 5, wherein
the first radio frame includes a plurality of first subframes to which subframe numbers are assigned,
the second radio frame includes a plurality of second subframes to which subframe numbers are assigned,
the first specific subframe is a subframe having a specific subframe number, of the plurality of first subframes,
the second specific subframe is a subframe having the specific subframe number, of the plurality of second subframes, and
the base station sets subframe numbers of the plurality of first subframes and subframe numbers of the plurality of second subframes to be shifted by a predetermined subframe number such that the first specific subframe and the second specific subframe do not overlap on the time axis.

7. The mobile communication system according to claim 1, wherein
the user terminal omits a measurement report process, which is a process for the handover procedure and for reporting a measurement result of a reception state in the user terminal to the serving cell, when the serving cell is switched between the first cell and the second cell.

8. The mobile communication system according to claim 1, wherein
when a serving cell of the user terminal is the first cell and an interference power level in the first uplink carrier is higher than a predetermined level, the base station controls the serving cell of the user terminal to be switched from the first cell to the second cell.

9. The mobile communication system according to claim 8, wherein after the serving cell of the user terminal is switched from the first cell to the second cell, the base station controls the first cell to be deactivated.

10. The mobile communication system according to claim 8, wherein when there is a handover request or a connection request for a new user terminal in the middle of switching the serving cell of the user terminal from the first cell to the second cell, the base station controls the new user terminal to be accommodated in the second cell.

11. The mobile communication system according to claim 8, wherein when the interference power level in the first uplink carrier is lower than a predetermined level after the serving cell of the user terminal is switched from the first cell to the second cell, the base station activates the first cell and controls the serving cell of the user terminal to be switched from the second cell to the first cell.

12. The mobile communication system according to claim 11, wherein the base station switches the serving cell of the user terminal from the second cell to the first cell and controls to deactivate the second cell.

13. The mobile communication system according to claim 11, wherein when there is a handover request or a connection request for a new user terminal in the middle of switching the serving cell of the user terminal from the second cell to the first cell, the base station controls the new user terminal to be accommodated in the first cell.

14. The mobile communication system according to claim 11, wherein on the basis of a communication state of the user terminal, the base station controls a serving cell of a user terminal with high priority among the user terminals to be preferentially switched.

15. A base station that constitutes a first cell and a second cell in a mobile communication system that employs a frequency division duplex scheme, comprising:

a control unit that controls a serving cell of a user terminal to be switched between the first cell and the second cell by a handover procedure, wherein the first cell uses a pair of first uplink carrier and downlink carrier for communication, and the second cell uses a pair of a second uplink carrier and the downlink carrier for communication.

16. A user terminal that communicates with a serving cell in the mobile communication system that employs a frequency division duplex scheme, comprising:

a control unit that controls the serving cell to be switched between a first cell and a second cell by a handover procedure, wherein the first cell uses a pair of first uplink carrier and downlink carrier for communication, and the second cell uses a pair of a second uplink carrier and the downlink carrier for communication.

* * * * *